(12) United States Patent
Seung et al.

(10) Patent No.: US 8,626,762 B2
(45) Date of Patent: Jan. 7, 2014

(54) DISPLAY APPARATUS AND METHOD OF PROVIDING A USER INTERFACE

(75) Inventors: Jung-ah Seung, Suwon-si (KR); Yun-ji Yoo, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 319 days.

(21) Appl. No.: 12/732,511

(22) Filed: Mar. 26, 2010

(65) Prior Publication Data

US 2011/0066627 A1  Mar. 17, 2011

(30) Foreign Application Priority Data

Sep. 14, 2009  (KR) .......................... 10-2009-0086507

(51) Int. Cl.
*G06F 17/30* (2006.01)
*G06F 3/048* (2013.01)

(52) U.S. Cl.
USPC ...... 707/736; 707/796; 707/805; 707/E17.03; 715/838; 715/848

(58) Field of Classification Search
USPC ................. 707/722, 736, 802, 796, 804, 805; 715/838, 848
See application file for complete search history.

(56) References Cited

U.S. PATENT DOCUMENTS

| | | | |
|---|---|---|---|
| 6,121,969 A * | 9/2000 | Jain et al. ....................... | 715/850 |
| 6,281,898 B1 | 8/2001 | Nikolovska et al. | |
| 6,356,971 B1 * | 3/2002 | Katz et al. ...................... | 710/301 |
| 7,046,230 B2 * | 5/2006 | Zadesky et al. ................ | 345/156 |
| 7,479,949 B2 * | 1/2009 | Jobs et al. ....................... | 345/173 |
| 7,698,658 B2 | 4/2010 | Ohwa et al. | |
| 8,493,408 B2 * | 7/2013 | Williamson et al. ........... | 345/629 |
| 2005/0210410 A1 | 9/2005 | Ohwa et al. | |
| 2011/0154196 A1 * | 6/2011 | Icho et al. ....................... | 715/702 |

FOREIGN PATENT DOCUMENTS

| | | |
|---|---|---|
| JP | 10-260671 | 9/1998 |
| KR | 112006004447 | 5/2006 |
| KR | 1020090043752 | 5/2009 |

OTHER PUBLICATIONS

Apple Inc., "iPod touch User Guide" manual, pp. 1-122, 2008.*
Apple Inc., "iPhone User Guide for iPhone OS 3.1 Software" manual, 2009, pp. 1-217.*
Christoffer Bjorkskog et al., "Mobile Implementation of a Web 3D Carousel With Touch Input", MobileHCI'09 Proceedings of the 11th International Conference on Human-Computer Interaction with Mobile Devices and Services, 2009, pp. 1-4.*
Su Lee Hyeon and A Sung Jeong, "Method for providing User Interface and display apparatus applying the same", Sep. 14, 2009, The Korean Intellectual Property Office (KR), application No. 10-2009-0086507.*
Korean Office Action dated Sep. 30, 2013 issued in KR Application 10-2009-0086507.

* cited by examiner

Primary Examiner — Cheryl Lewis
(74) Attorney, Agent, or Firm — Stanzione & Kim, LLP

(57) ABSTRACT

A method of providing a user interface (UI) and a display apparatus having the same. In a method for providing a UI, a display apparatus receives an manipulation for two or more axis directions, and searches for one of a plurality of images by applying two or more different classification standards according to the directions of the received input manipulation. Therefore, the user may easily search for a desired image using one or more classification standards.

24 Claims, 22 Drawing Sheets

1200

DISPLAY APPARATUS AND METHOD OF PROVIDING A USER INTERFACE

CROSS-REFERENCE TO RELATED APPLICATIONS

This application claims priority under 35 U.S.C. §119(a) from Korean Patent Application No. 10-2009-0086507, filed on Sep. 14, 2009, in the Korean Intellectual Property Office, the disclosure of which is incorporated herein by reference in its entirety.

BACKGROUND

1. Field of the Invention

The present general inventive concept relates to a method of providing a user interface (UI), and a display apparatus adopting the same. More particularly, the present general inventive concept relates to a method of providing a UI to search for a desired image from among stored images, and a display apparatus adopting the same.

2. Description of the Related Art

As technology has been developing, the storage capability of display apparatuses has enhanced. Accordingly, a user may store a large number of images in a display apparatus.

If a large number of images are stored in a display apparatus, it takes a long time to search for a desired image. Even after the user searches for a desired image, the user typically searches other images stored in the display apparatus through many procedures in order to find another desired image related to the found image.

In particular, since most display apparatuses are designed to search for an image based on a single classification standard, the user generally views images arranged according to the single classification standard and selects a desired image. In order to change the classification standard, the user typically must perform a separate operation of changing settings of a display apparatus, causing inconvenience to the user.

SUMMARY

Users of display apparatus wish to search for images with greater ease and convenience. Therefore, there is a need for a method of providing a UI to received user input to easily search for an image with a plurality of classification standards.

The present general inventive concept provides a method of providing a user interface (UI) in which a manipulation for two or more axis directions is input and two or more classification standards are applied according to the direction in which the manipulation is input so that one of the images may be found, and a display apparatus adopting the same.

Additional aspects and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a method of providing a user interface (UI), the method including receiving an input manipulation for two or more axis directions, and searching for one of a plurality of images by applying two or more different classification standards according to the directions of the received input manipulation.

The two or more axis directions may include a first axis direction, a second axis direction, and a third axis direction, the two or more classification standards may include a first classification standard, a second classification standard, and a third classification standard, and the searching for one of the plurality of images may include searching for an image according to the first classification standard when the received input manipulation is in the first axis direction, searching for an image according to the second classification standard when the received input manipulation is in the second axis direction, and searching for an image according to the third classification standard when the received input manipulation is in the third axis direction.

On a display, the first axis direction may be a horizontal direction, the second axis direction may be a vertical direction, and the third axis direction may be a diagonal direction.

The first classification standard, the second classification standard, and the third classification standard each may correspond to one of time, person, place, color, event, and type of scene.

The received input manipulation may be a short stroke or a long stroke, and the searching for the image according to the first classification standard may include searching for a previous image or a subsequent image according to the first classification standard when the short stroke of the received input manipulation is in the first axis direction, and searching for an image in a different category according to the first classification standard when the long stroke of the received input manipulation is in the first axis direction.

The received input manipulation may be a short stroke or a long stroke, and the searching for the image according to the second classification standard may include searching for a previous image or a subsequent image according to the second classification standard when the short stroke of the received input manipulation is in the second axis direction, and searching for an image in a different category according to the second classification standard when the long stroke of the received input manipulation is in the second axis direction.

If a currently searched image changes, the plurality of images may be rearranged according to the first, second and third classification standard according to the changed image.

The method may further include displaying thumbnails of images classified according to the first classification standard in an x-axis direction in a 3-dimensional space of a display, displaying thumbnails of images classified according to the second classification standard in an y-axis direction in the 3-dimensional space of the display, and displaying thumbnails of images classified according to the third classification standard in a z-axis direction in the 3-dimensional space of the display.

The method may further include displaying only a currently searched image on a display from among the plurality of images to be searched.

Exemplary embodiments of the present general inventive concept may also be achieved by providing a display apparatus including a storage unit to store a plurality of images, a manipulation unit to receive an input manipulation in two or more axis directions, and a control unit to searching for one of the plurality of images by applying two or more different classification standards according to the received input manipulation.

The two or more axis directions may include a first axis direction, a second axis direction, and a third axis direction, the two or more classification standards may include a first classification standard, a second classification standard, and a third classification standard, and the control unit may search for an image according to the first classification standard when the received input manipulation is in the first axis direction, the control unit may search for an image according to the second classification standard when the received input manipulation is in the second axis direction, and the control unit may search for an image according to the third classification standard when the received manipulation is in the third axis direction.

On a display, the first axis direction may be a horizontal direction, the second axis direction may be a vertical direction, and the third axis direction may be a diagonal direction.

The first classification standard, the second classification standard, and the third classification standard each may correspond to one of time, person, place, color, event, and type of scene.

The received input manipulation may be a short stroke or a long stroke, and the control unit may search for a previous image or a subsequent image according to the first classification standard when the short stroke of the received input manipulation is in the first axis direction, and the control unit may search for an image in a different category according to the first classification standard when the long stroke of the received input manipulation is in the first axis direction.

The received input manipulation may be a short stroke or a long stroke, and the control unit may search for a previous image or a subsequent image according to the second classification standard when the short stroke of the received input manipulation is in the second axis direction, and the control unit may search for an image in a different category according to the second classification standard when the long stroke of the received input manipulation is in the second axis direction.

When a currently searched image changes, the control unit may rearrange the plurality of images according to the first, second and third classification standard according to the changed image.

The control unit may display thumbnails of images classified according to the first classification standard in an x-axis direction in a 3-dimensional space of a display, the control unit may display thumbnails of images classified according to the second classification standard in an y-axis direction in the 3-dimensional space of the display, and the control unit may display thumbnails of images classified according to the third classification standard in a z-axis direction in the 3-dimensional space of the display.

The control unit may display only a currently searched image on a display from among the plurality of images to be searched.

Exemplary embodiments of the present general inventive concept may also be achieved by providing a method of providing a user interface (UI), the method including displaying thumbnails of images classified according to a first classification standard in a first axis direction in a 3-dimensional space of a display, displaying thumbnails of images classified according to a second classification standard in a second axis direction in the 3-dimensional space of the display, and displaying thumbnails of images classified according to a third classification standard in a third axis direction in the 3-dimensional space of the display.

Exemplary embodiments of the present general inventive concept may be achieved by providing a method of providing a user interface (UI), the method including searching for content according to a first classification standard when an input manipulation in a first axis direction is received, searching for content according to a second classification standard when an input manipulation in a second axis direction is received, and searching for content according to a third classification standard when an input manipulation in a third axis direction is received.

The content may be music, the first classification standard may be a genre, the second classification standard may be a singer, and the third classification standard may be an album.

Exemplary embodiments of the present general inventive concept also include a method of searching for stored content with a graphical user interface of a display apparatus, the method including receiving an input manipulation from the graphical user interface of the display apparatus in a plurality of axis directions to select a classification of the content to be searched, and searching for stored content in a storage unit of a display apparatus according to the received input manipulation.

The method may also include receiving a selection a type of the stored content with the graphical user interface of the display apparatus.

The method may also include where each axis of the plurality of axis directions is a different classification of the content.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Figure 1:
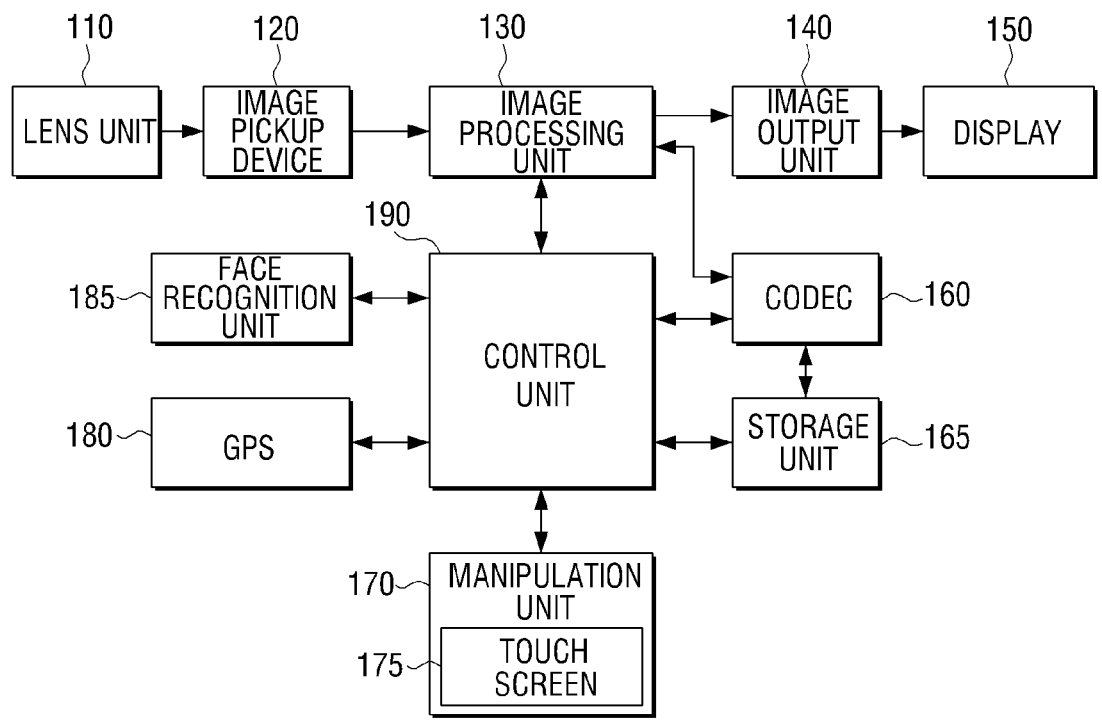
FIG. 1 is a detailed block diagram illustrating a configuration of a camera according to exemplary embodiments of the present general inventive concept.

Reference will now be made in detail to the present embodiments of the present general inventive concept, examples of which are illustrated in the accompanying drawings, wherein like reference numerals refer to like elements throughout. The embodiments are described below in order to explain the present general inventive concept by referring to the figures.

FIG. 1 is a detailed block diagram illustrating a configuration of a camera 100 according to an exemplary embodiment of the present general inventive concept. As illustrated in FIG. 1, the camera 100 may include a lens unit 110, an image pickup device 120, an image processing unit 130, an image output unit 140, a display 150, a codec 160, a storage unit 165, a manipulation unit 170, a Global Positioning System (GPS) 180, a face recognition unit 185, and a control unit 190.

The lens unit 110 can focus light from a subject onto an image pickup area.

The image pickup device 120 can convert light entering via a lens into an electric signal and can process the electric signal. That is, the image pickup device can capture the image of the subject. The image pickup device 120 may include pixels and an analog-to-digital (AD) converter. One or more pixels may output an analog image signal, and the AD converter can convert the analog image signal into a digital image signal.

The image processing unit 130 can process an image signal input from the image pickup device 120, and can transmit the processed image signal to the image output unit 140 to display a captured image. For example, the image processing unit 103 can sharpen, correct the white balance, remove and/or minimize motion blur, change and/or modify the color space, and/or compress the captured image. The image processing unit 130 can process an image signal input from the control unit 190, and can transmit the processed image signal to the image output unit 140 to display a stored image or an image search menu.

The image search menu includes a graphical user interface (GUI) to receive a selection from a user of a desired image from among the images stored in the storage unit 165. The image search menu may be in one of a thumbnail view mode and a single view mode.

In the thumbnail view mode, the image search menu can display thumbnails for a plurality of images in a 3-dimensional space in the x-axis, y-axis, and z-axis directions. The thumbnails displayed in the x-axis, y-axis, and z-axis directions are thumbnails for images arranged according to one or more classification standards. The classification standard indicates a standard to classify an image. More specifically, the classification standard may be, for example, one of time, person, place, color, event, and type of scene. For example, in an image search menu, thumbnails for images arranged according to a classification standard related to time (that is, arranged according to time at which images are captured) may be displayed in the x-axis direction, thumbnails for images arranged according to a classification standard related to person (that is, arranged according to person who is captured in a photograph) may be displayed in the y-axis direction, and thumbnails for images arranged according to classification standard related to place (that is, arranged according to place in which images are captured) may be displayed in the z-axis direction.

In the single view mode, the image search menu can display a currently searched image from among the images to be searched.

The image processing unit 130 can transmit an image signal processed to display such an image search menu to the image output unit 140.

The image processing unit 130 can output a processed image signal to the codec 160 so as to store a captured image. More specifically, the image processing unit 130 can convert a format of an image signal output by the image pickup device 120, and can perform digital zooming, auto white balance (AWB), auto focus (AF), auto exposure (AE), and the like so as to adjust scale of the image.

The image processing unit 130 can receive and process an image stored in the storage unit 165 using the codec 160, and can output the processed image to the image output unit 140.

The image output unit 140 can output an image signal received from the image processing unit 130 to the internal display 150 or an external output terminal. A display device, a digital projector, a computer, a personal digital assistant (PDA), and/or any other suitable device may be connected to the external output terminal to receive the image from the image processing unit 130 to be displayed.

The display 150 can display a captured image or an image search menu. The display 150 may display the image search menu in the thumbnail view mode or the single view mode, or any other suitable view mode to carry out the exemplary embodiments of the present general inventive concept.

The codec 160 can encode an image received from the image processing unit 130 and transmit the encoded image to the storage unit 165. The codec 160 can decode an image stored in the storage unit 190 and can transmit the decoded image to the image processing unit 130.

That is, when a captured image is stored in the storage unit 190, the codec 160 can encode the image, and when a stored image is output to the image processing unit 130, the codec 160 can decode the image.

The storage unit 165 can store an image captured by the image pickup unit 120 in a compressed format, and can store information regarding the time at which the image is captured and information regarding the place in which the image is captured. The place information is generated can based on position information obtained by the GPS 180, which may include at least one set of GPS coordinates of the place in which the image is captured, an address, and the name of the place.

The storage unit 165 may be a flash memory, a hard disk, or the like.

The manipulation unit 170 can receive a user command. More specifically, the manipulation unit 170 can receive a user command related to two or more axis directions (for example, a horizontal direction, a vertical direction, and a diagonal direction) such as the two or more axis directions illustrated in FIG. 3A.

The manipulation unit 170 may be implemented as buttons on the surface of the camera 100, or as a touch screen 175 capable of recognizing touch by the user on the display 150.

The GPS 180 can detect coordinate information of a current position using a satellite. The control unit 190 can match the coordinate information with a captured image.

The face recognition unit 185 can recognize a human face from a captured image. More specifically, to recognize a human face, the face recognition unit 185 can detect a face from an image, and can recognize features of the face. The face recognition unit 185 can detect a face from an image by detecting an area including a face from an image. The face recognition unit 185 can recognize features of a face by differentiating the face from other faces.

Detection of a face can be by a face area based on color, detection of an eye area based on at least one edge, normalization of the face area, and verification of the face area according to a support vector machine (SVM).

Detection of a face area based on color can be performed by detecting a face from an input image using information regarding color of human skin. More specifically, to extract a face area, a skin filter can be generated using YCbCr information of the input image. That is, a skin-color area can be extracted from the input image.

An eye area can be detected according to detected edges of an eye area using brightness. Generally, an eye area can be detected using edges and brightness, but there is a possibility that an error may occur due to hair style, eye glasses, and/or sunglasses.

The face area can be normalized using the detected eye area. Using the SVM, the normalized face area can be verified. If a SVM face area detection device is used, the possibility of a wrong face area is detected is reduced to less than 1%.

The face recognition unit 185 can detect a face from an image.

There are at least two exemplary methods of recognizing features of face: a holistic approach and an analytic approach.

The holistic approach can recognize a face by considering features of at least a portion of or the entire area of a face pattern, which includes an Eigenface method and a template matching-based method.

The analytic approach can recognize a face by extracting geometrical features of face. An advantage of the analytic approach is fast recognition and minimized memory usage, but it may have decreased accuracy (e.g., in comparison with the accuracy of the holistic approach) in selecting and extracting features of a face.

Recognizing features of face may include the following operations. The face recognition unit 185 can receive an image including a face, and can extract features of face such as eyes, nose, mouth, and the like. The face recognition unit 185 can perform at least one adjustment if the face is rotated or illuminated. The face recognition unit 185 can extract features of face from the image and can detect the face from the image.

That is, the face recognition unit 185 can detect the overall pattern of a face from an image and can recognize features of a face using the detected face pattern. By at least these operations, the face recognition unit 185 can perform face recognition.

The control unit 190 can control the operation of the camera 100. The control unit 190 can search for one of the plurality of images by, for example, applying two or more different classification standards according to a direction received as manipulation input from the user.

More specifically, if a manipulation input in a first axis direction is received, the control unit 190 can search for an image according to a first classification standard, if a manipulation input in a second axis direction is received, the control unit 190 can search for an image according to a second classification standard, and if a manipulation input in a third axis direction is received, the control unit 190 can search for an image according to a third classification standard.

On the display screen, the first axis direction may be a horizontal direction, the second axis direction may be a vertical direction, and the third axis direction may be a diagonal direction.

Figure 3A:
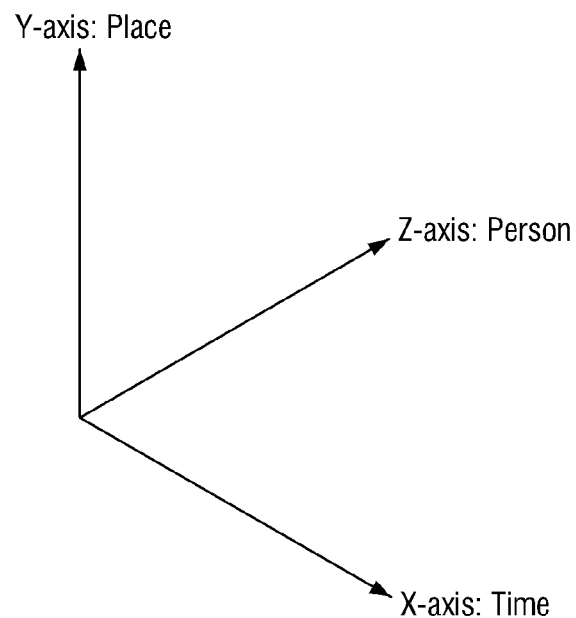
FIGS. 3A and 3B illustrate arranged images according to classification standards corresponding to three axis directions according to exemplary embodiments of the present general inventive concept.

The first, second and third classification standard each may correspond to one of time, person, place, color, event, and type of scene, as illustrated, for example, in FIG. 3A.

If a classification standard is time, the control unit 190 can arrange the images in chronological order or reverse chronological order. If a classification standard is person, the control unit 190 can arrange the images so that images having the same face recognized by the face recognition unit 185 are arranged together. If a classification standard is place, the control unit 190 can arrange the images so that images having the same place information detected by the GPS 180 and/or tagged by the camera 100 or a user to indicate place information are arranged together. If a classification standard is color, the control unit 190 can detect color information of the images and can arrange the images so that images having similar one or more colors are arranged together. For example, images that have a predetermined percentage of a preselected color may be arranged together, or image having a predetermined ratio of colors may be arranged together. If a classification standard is event, the control unit 190 can arrange the images so that images having the same event input by the user can be arranged together. For example, a user may selectively tag and/or identify one or more photos with one or more event tags, and the images can be arranged by their respective event tags. If a classification standard is type of scene, the control unit 190 can arrange the images so that images having the same type of scene can be arranged together.

The type of scene can include a type of subject included in an image, for example, a landscape, a person, and a night view.

If a short stroke is input in the first axis direction, the control unit 190 can search for a previous image or a subsequent image according to the first classification standard and can control the display 150 to display the selected image on the screen.

If a long stroke is input in the first axis direction, the control unit 190 can search for an image in a previous category or a subsequent category according to the first classification standard and can control the display 150 to display the selected image on the screen.

A stroke can indicate that a touch of the display screen has been received from a user, that touch has been maintained with movement at a certain distance, and that the touch input received from the user has ceased. A short stroke can indicate a received user touch to the screen, that touch has been maintained with movement at less than a threshold distance, and that touch input receive from a user has ceased. A long stroke indicates that that a user touch to the screen has been received, that touch has been maintained with movement received from a user that is greater than a threshold distance, and touch input receive from a user has ceased. The threshold distance can indicate a touched distance that determines whether a stroke is long or short.

The category can indicate a group of images divided according to one or more classification standards. For example, if a classification standard is person, images related to the same person can be a single category, if a classification standard is time, images related to the same date can be a single category, if a classification standard is place, images related to the same place can be a single category, if a classification standard is color, images related to the same color can be a single category, if a classification standard is event, images related to the same event can be a single category, and if a classification standard is type of scene, images related to the same scene can be a single category.

For example, when the first classification standard is person, if a short stroke is input in the first axis direction, the control unit 190 can search for a previous image or a subsequent image that is related to a person in a currently searched image. If a long stroke is input in the first axis direction, the control unit 190 can search for an image related to a previous person or a subsequent person who is different from a person in a currently searched image.

If a short stroke is input in the second axis direction, the control unit 190 can search for a previous image or a subsequent image according to the second classification standard and can control the display 150 to display the selected image on the screen.

If a long stroke is input in the second axis direction, the control unit 190 can search for an image in a previous category or a subsequent category according to the second classification standard and can control the display 150 to display the selected image on the screen.

If a short stroke is input in the third axis direction, the control unit 190 can search for a previous image or a subsequent image according to the third classification standard and can control the display 150 to display the selected image on the screen.

If a long stroke is input in the third axis direction, the control unit 190 can search for an image in a previous category or a subsequent category according to the third classification standard and can control the display 150 to display the selected image on the screen.

If a currently searched image changes, the control unit 190 can rearrange the images according to the first, second and third classification standard according to the currently searched image. That is, the control unit 190 can rearrange the images according to the first, second and third classification standard according to a currently searched image.

The control unit 190 may control an image search menu to be displayed in the thumbnail view mode. In other words, the control unit 190 can display thumbnails of images divided according to the first classification standard in the x-axis direction, can display thumbnails of images divided according to the second classification standard in the y-axis direction, and can display thumbnails of images divided according to the third classification standard in the z-axis direction in a 3-dimensional space of the display screen.

The control unit 190 may control an image search menu to be displayed in the single view mode. In other words, the control unit 190 can display a currently searched image from among the images on the display screen.

The control unit 190 can apply a different classification standard according to the at least three touch directions of received manipulation input to search for an image. Accordingly, the user can easily search for a desired image using one or more classification standards.

Figure 2:
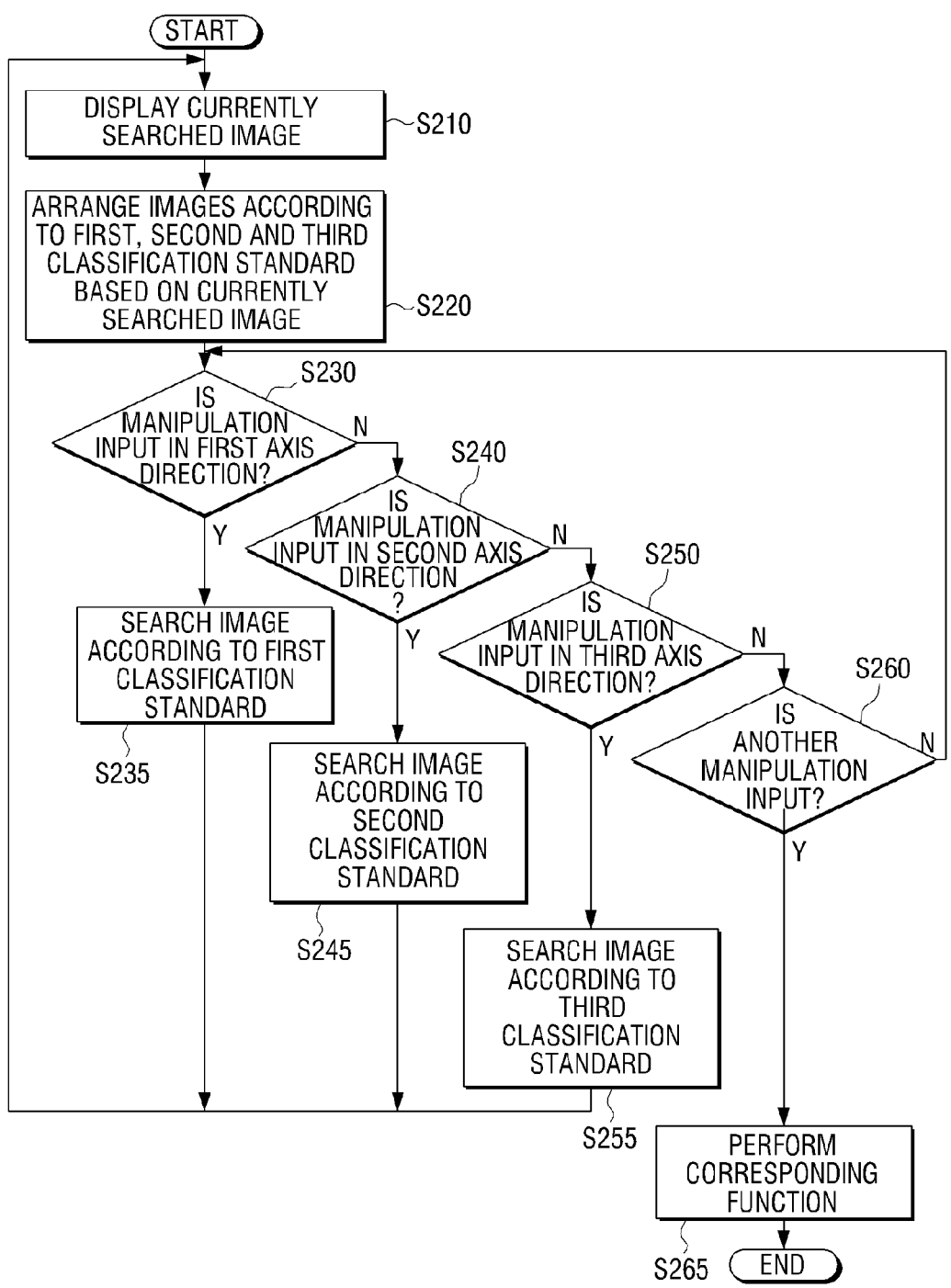
FIG. 2 is a flow chart illustrating a method of providing a UI according to exemplary embodiments of the present general inventive concept.

Hereinafter, a method of providing a UI to search for an image using three axis directions is described with reference to FIG. 2. FIG. 2 is a flow chart illustrating a method of providing a UI according to exemplary embodiments of the present general inventive concept.

In operation S210, the camera 100 can display a currently searched image on the screen. More specifically, the camera 100 can display a currently searched image on an image search menu.

The image search menu can indicate a graphical user interface (GUI) which is provided to receive a selection from a user of a desired image from among the images stored in the storage unit 165. The image search menu may be in one of the thumbnail view mode and the single view mode.

In the thumbnail view mode, the image search menu can display thumbnails for a plurality of images in a 3-dimensional space in x-axis, y-axis, and z-axis directions. The thumbnails displayed in x-axis, y-axis, and z-axis directions can be thumbnails of images arranged according to one or more different classification standards. The classification standard indicates a standard to classify an image. More specifically, the classification standard may be one of time, person, place, color, event, and type of scene. For example, in an image search menu, thumbnails for images arranged according to a classification standard related to time (that is, arranged according to time in which images are captured) may be displayed in the x-axis direction, thumbnails for images arranged according to a classification standard related to person (that is, arranged according to person who is captured in a photograph) may be displayed in the y-axis direction, and thumbnails for images arranged according to classification standard related to place (that is, arranged according to place in which images are captured) may be displayed in the z-axis direction.

In the single view mode, the image search menu can display a currently searched image from among the images to be searched.

In operation S220, the camera 100 can arrange the images according to the first, second and third classification standard based on the currently searched image. That is, the camera 100 can rearrange the images according to the first, second and third classification standard according to a currently searched image.

In operation S230, the camera 100 can determine whether or not a manipulation in the first axis direction has been received from a user. In operation S230-Y, if an input manipulation in the first axis direction has been received, the camera 100 can search for an image according to the first classification standard in operation S235, and can display a currently searched image on the display screen in operation S210.

More specifically, if a short stroke input in the first axis direction is received, the camera 100 can search for a previous image or a subsequent image according to the first classification standard. If a long stroke input in the first axis direction is received, the camera 100 can search for an image in a previous category or a subsequent category according to the first classification standard.

For example, if the first axis direction is a horizontal direction and the first classification standard is time, and if a short stroke input to the right is received, the camera 100 can search for a subsequent image according to the order of the time in which an image was captured. If a long stroke input to the right is received, the camera 100 can search for an image (that is, an image in a subsequent time category) which was captured on the next date of the date on which the currently searched image was captured according to the order of the time in which an image was captured.

In operation S240, the camera 100 can determine whether or not an input manipulation in the second axis direction is received from a user. In operation S240-Y, if an input manipulation in the second axis direction is received, the camera 100 can search for an image according to the second classification standard in operation S245, and can display a currently searched image on the screen in operation S210.

More specifically, if a short stroke input in the second axis direction is received, the camera 100 can search for a previous image or a subsequent image according to the second classification standard. If a long stroke input in the second axis direction is received, the camera 100 can search for an image in a previous category or a subsequent category according to the second classification standard.

For example, if the second axis direction is a vertical direction and the second classification standard is place, and if a short stroke upwards is received as input, the camera 100 can search for a subsequent image according to the order of the place in which an image was captured. If a long stroke upwards is received as input, the camera 100 can search for an image (that is, an image in a subsequent place category)

which was captured in a place which is different from the place in which the currently searched image was captured according to the order of the place in which an image was captured.

In operation S250, the camera 100 can determine whether or not an input manipulation in the third axis direction is received. In operation S250-Y, if an input manipulation in the third axis direction is received, the camera 100 can search for an image according to the third classification standard in operation S255, and can display a currently searched image on the display screen in operation S210.

More specifically, if a short stroke input in the third axis direction is received, the camera 100 can search for a previous image or a subsequent image according to the third classification standard. If a long stroke input in the third axis direction is received, the camera 100 can search for an image in a previous category or a subsequent category according to the third classification standard.

For example, if the third axis direction is a diagonal direction (that is, a left downward direction and a right upward direction) and the third classification standard is person, and if a short stroke input in a right upward direction is received, the camera 100 can search for a subsequent image according to the order of a person included in an image. If a long stroke input in a right upward direction is received, the camera 100 can search for an image (that is, an image in a subsequent person category) including a person which is different from a person included in the currently searched image according to the order of a person included in an image.

When the user inputs a manipulation diagonally, the camera 100 may recognize the diagonal direction as a horizontal direction or a vertical direction. To minimize and/or prevent a directional mis-recognition, the camera 100 may recognize a diagonal manipulation using a manipulation which is different from a horizontal manipulation and a vertical manipulation. For example, the camera 100 may recognize a vertical manipulation or a horizontal manipulation from a received stroke, and may recognize a diagonal manipulation from a received multi-touch stroke. That is, the camera 100 may recognize a vertical manipulation or a horizontal manipulation from a received stroke, and may recognize a diagonal manipulation from a selected button and a received stroke.

In operation S260-Y, if another manipulation input is received, the camera 100 can perform a function in operation S265 that corresponds to the received input manipulation.

The camera 100 can search for an image by applying a different classification standard according to the at least three touch directions of input manipulation that may be received, so an image can be searched for with one or more classification standards.

Hereinafter, operation of the camera 100 is described according to a received input (e.g., a touch by the user) with reference to FIGS. 3A to 12.

Figure 3B:
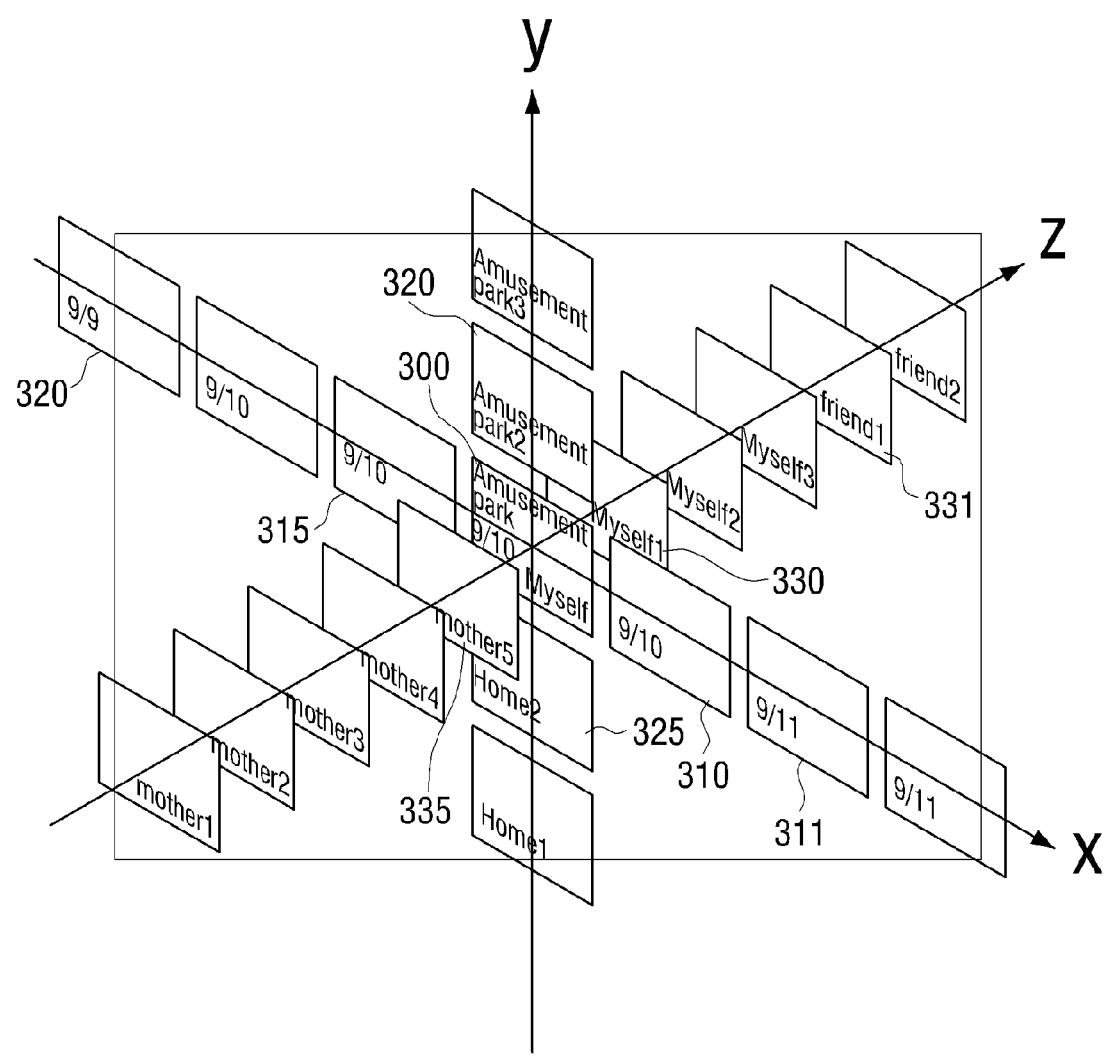

FIGS. 3A and 3B illustrate that images are arranged according to classification standards corresponding to three axis directions according to exemplary embodiments of the present general inventive concept.

FIG. 3A illustrates coordinates which may be used to arrange images. As illustrated in FIG. 3A, the camera 100 can assign the x-axis with a classification standard related to time, assign the y-axis with a classification standard related to place, and assign the z-axis with a classification standard related to person.

FIG. 3B illustrates that images can be arranged in the x, y and z axis in a 3-dimensional space according to classification standards related to at least time, place, and person. As illustrated in FIG. 3B, the camera 100 can arrange stored images along the x, y and z axis in a 3-dimensional space according to classification standards related to time, place, and person, as illustrated in FIG. 3B.

Referring to FIG. 3B, example images from September 9 until September 11 can be arranged along the x-axis according to time basis, images related to amusement park and home can be arranged along the y-axis according to place basis, and images related to mother, myself, and friend can be arranged along the z-axis according to person basis. In FIG. 3B, a currently searched image 300 can be, for example, related to September 10 according to time, to amusement part based on place, and to myself based on person.

When images are arranged as illustrated in FIG. 3B, if a short stroke input to the left (in the direction of −x) is received, the camera 100 can search for a subsequent image (that is, a first image 310) according to the order of the time in which an image was captured. If a long stroke input to the left is received, the camera 100 can search for an image (that is, a second image 311) which was captured on the next date (September 11) of the date (September 10) on which the currently searched image 300 was captured according to the order of the time in which an image was captured (that is, searches for an image in a different time category).

When images are arranged as illustrated in FIG. 3B, if a short stroke input to the right (in the direction of +x) is received, the camera 100 can search for a previous image (that is, a third image 315) according to the order of the time in which an image was captured. If a long stroke is input to the right, the camera 100 can search for an image (that is, a fourth image 320) which was captured on the previous date (September 9) of the date (September 10) on which the currently searched image 300 was captured according to the order of the time in which an image was captured (that is, searches for an image in a different time category).

When images are arranged as illustrated in FIG. 3B, if a short stroke input downwards (in the direction of −y) is received, the camera 100 can search for a subsequent image (that is, a fifth image 320) according to the order of the place (e.g., location) in which an image was captured. If a long stroke input downwards is received, the camera 100 can search for an image (not illustrated) which was captured in a place which is different from the place (e.g., amusement park) in which the currently searched image 300 was captured according to the order of the place in which an image was captured (that is, searches for an image in a different place category).

When images are arranged as illustrated in FIG. 3B, if a short stroke input upwards (in the direction of +y) is received, the camera 100 can search for a previous image (that is, a sixth image 325) according to the order of the place in which an image was captured. If a long stroke input upwards is received, the camera 100 can search for an image (that is, the sixth image 325) which was captured in a place which is different from the place (amusement park) in which the currently searched image 300 was captured according to the order of the place in which an image was captured (that is, searches for an image in a different place category).

When images are arranged as illustrated in FIG. 3B, if a short stroke input in the left downward direction (in the direction of −z) is received, the camera 100 can search for a subsequent image (that is, a seventh image 330) according to the order of a person included in an image. If a long stroke input in the left downward direction is received, the camera 100 can search for an image (that is, an eighth image 331) including a person (e.g., friend) which is different from a person (e.g., myself) included in the currently searched image 300 according to the order of a person included in an image (that is, searches for an image in a different person category).

When images are arranged as illustrated in FIG. 3B, if a short stroke input in the right upward direction (in the direction of +z) is received, the camera 100 can search for a previous image (that is, a ninth image 335) according to the order of a person included in an image. If a long stroke input in the right upward direction is received, the camera 100 can sarch for an image (that is, the ninth image 335) including a previous person (e.g., mother) which is different from a person (e.g., myself) included in the currently searched image 300 according to the order of a person included in an image (that is, searches for an image in a different person category).

The camera 100 can search for an image based on one or more different classification standards according to the direction of a stroke.

Figure 4:
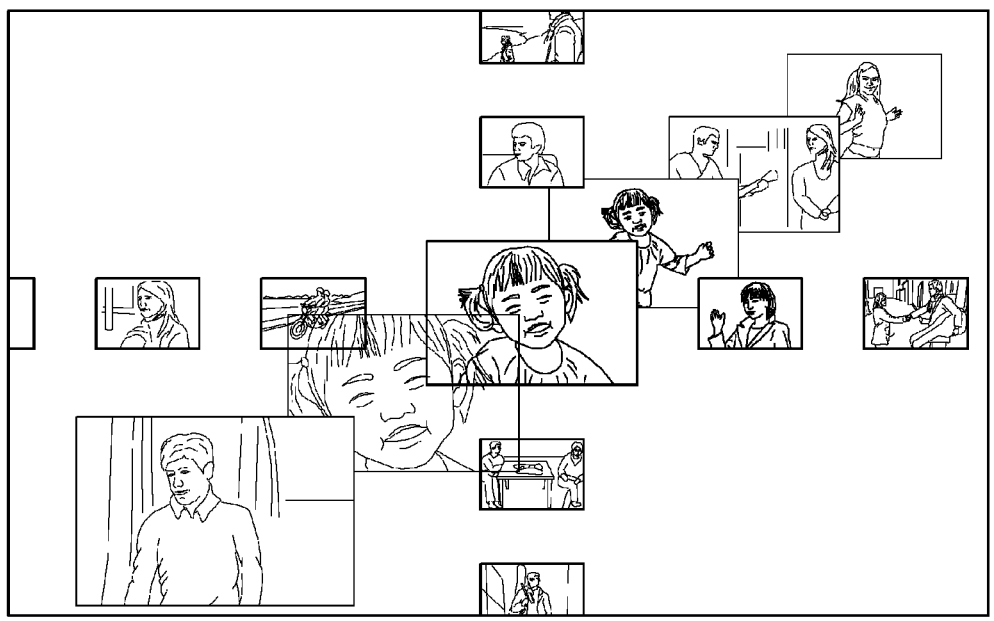
FIG. 4 illustrates a screen displaying an image search menu in a thumbnail view mode according to exemplary embodiments of the present general inventive concept.

FIG. 4 illustrates a screen displaying an image search menu in the thumbnail view mode according to exemplary embodiments of the present general inventive concept. As illustrated in FIG. 4, the camera 100 displays an image search menu in the thumbnail view mode in a 3-dimensional space. Referring to FIG. 4, in the thumbnail view mode, stored images are arranged and displayed according to the classification standards of time, place, and person in the x-axis, y-axis, and z-axis of a 3-dimensional space (e.g., as illustrated in FIGS. 3A-3B).

The image search menu in the thumbnail view mode can receive an input a stroke from a user and search for an image according to one or more classification standards (e.g., a selected classification).

Figure 5A:
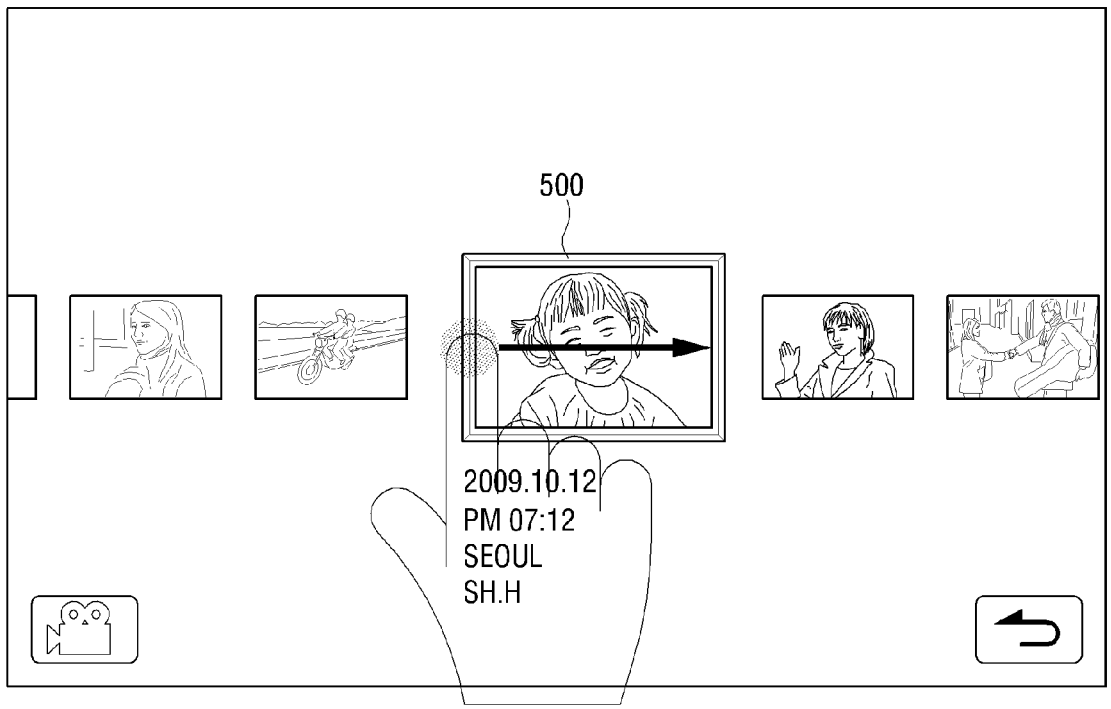
FIGS. 5A and 5B illustrate that a short stroke to the right is received as input according to exemplary embodiments of the present general inventive concept.
Figure 5B:
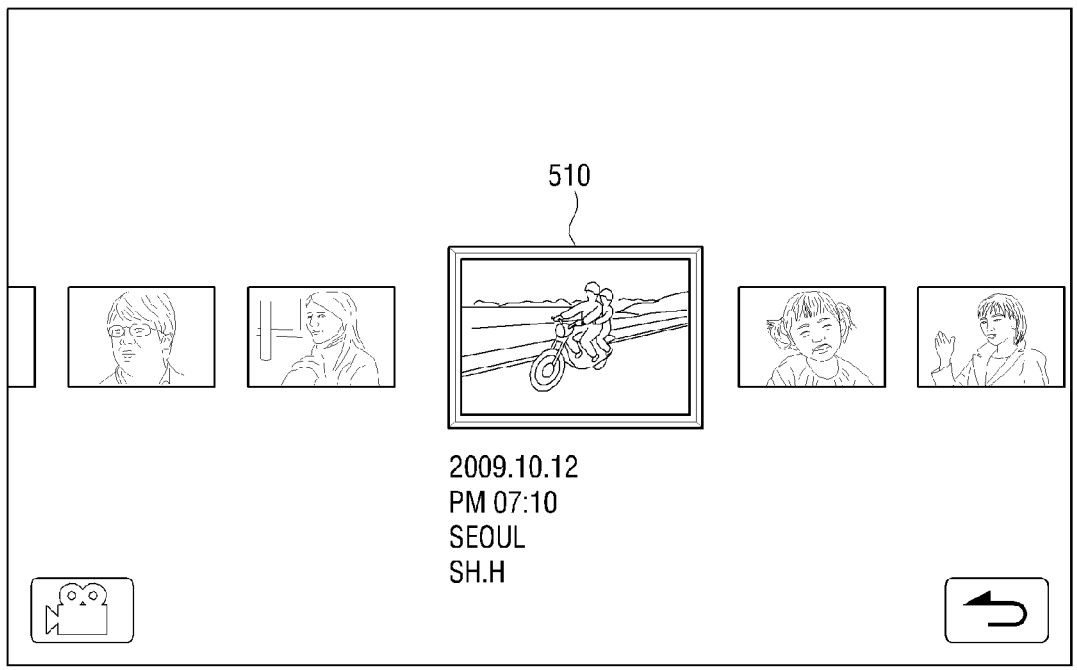

FIGS. 5A and 5B illustrate that a short stroke input to the right is received according to exemplary embodiments of the present general inventive concept. If a stroke input horizontally is received, the camera 100 can search for an image according to a classification standard related to time.

As illustrated in FIG. 5A, a currently searched image 500 was captured at 7:12 pm on Oct. 12, 2009. If the user inputs a short stroke to the right as illustrated by the directional arrow in FIG. 5A, a previous image is searched as illustrated in FIG. 5B. A currently searched image 510 illustrated in FIG. 5B was captured at 7:10 pm.

Figure 6A:
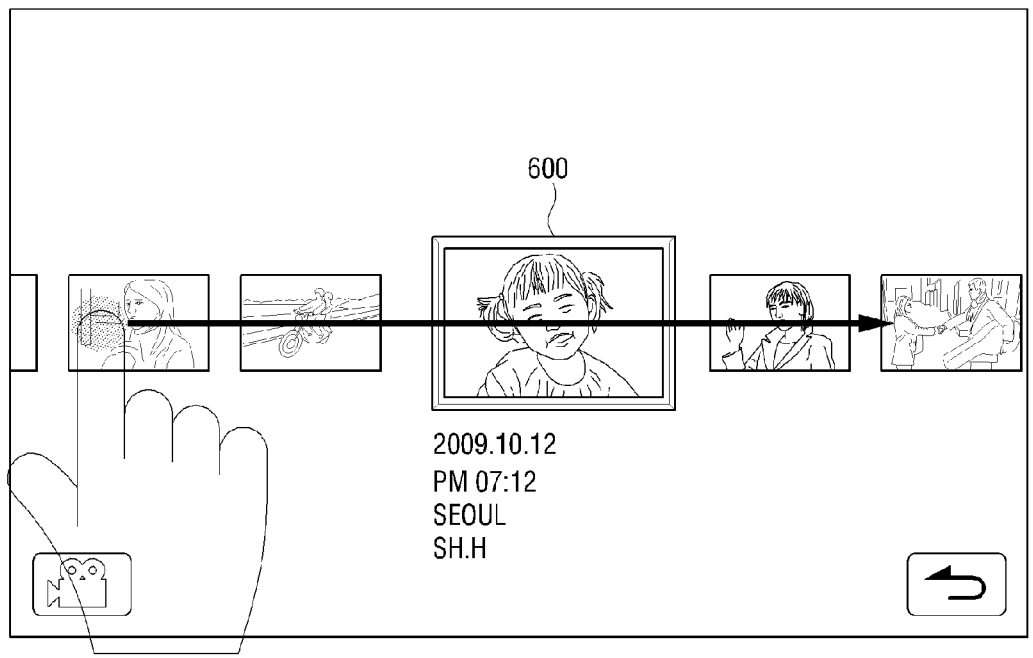
FIGS. 6A and 6B illustrate that a long stroke to the right is received as input according to exemplary embodiments of the present general inventive concept.
Figure 6B:
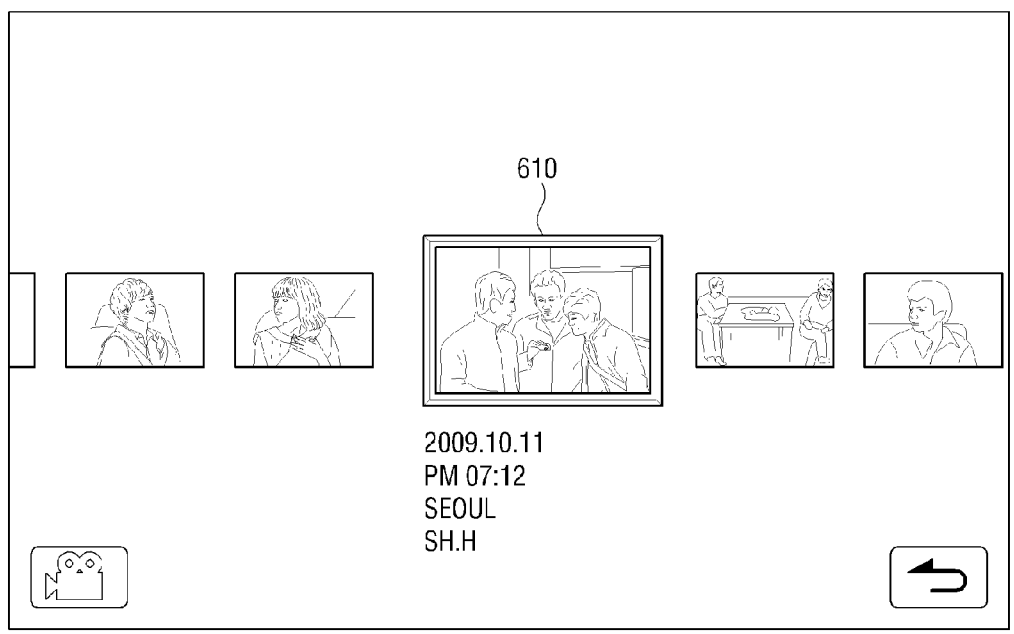

FIGS. 6A and 6B illustrate that a long stroke input to the right is received according to exemplary embodiments of the present general inventive concept. If a stroke input horizontally is received, the camera 100 can search for an image according to a classification standard related to time.

FIG. 6A illustrates that a currently searched image 600 was captured at 7:12 pm on Oct. 12, 2009. If a long stroke to the right is received from the user as in FIG. 6A, an image which was captured on a previous date can be searched, as illustrated in FIG. 6B. Therefore, a currently searched image 610 illustrated in FIG. 6B was captured on Oct. 11, 2009.

Figure 7A:
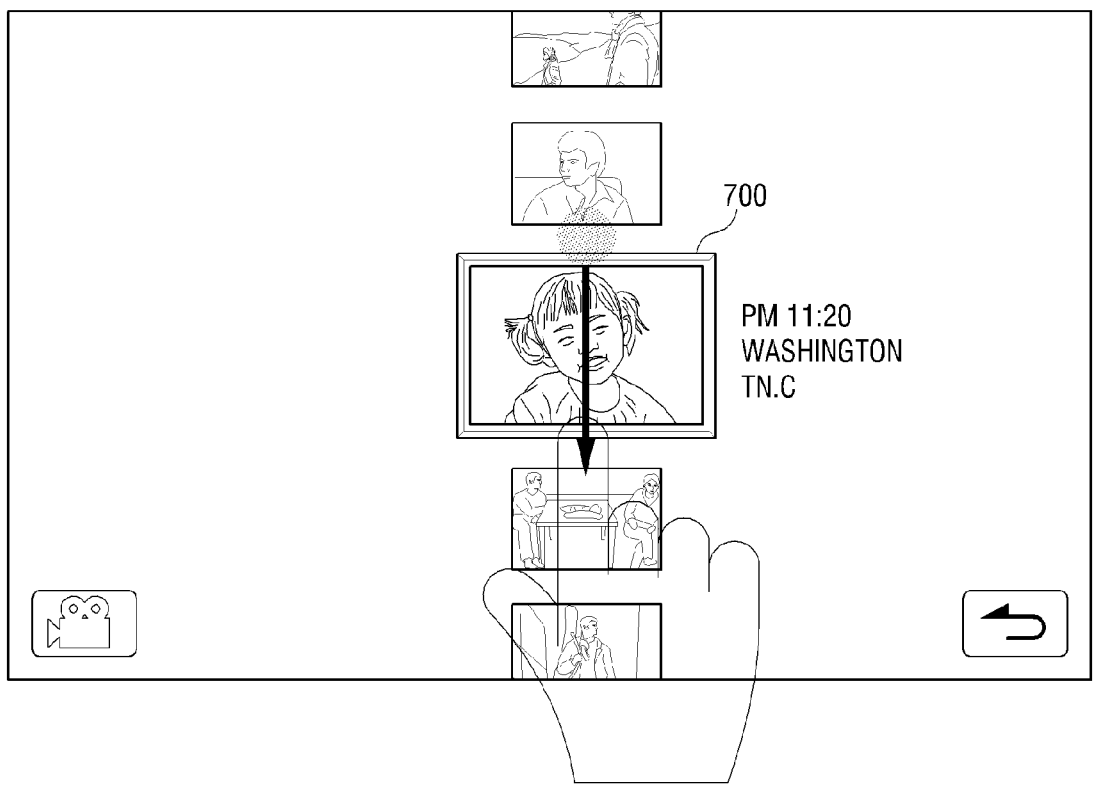
FIGS. 7A and 7B illustrate that a short stroke downwards is received as input according to exemplary embodiments of the present general inventive concept.
Figure 7B:
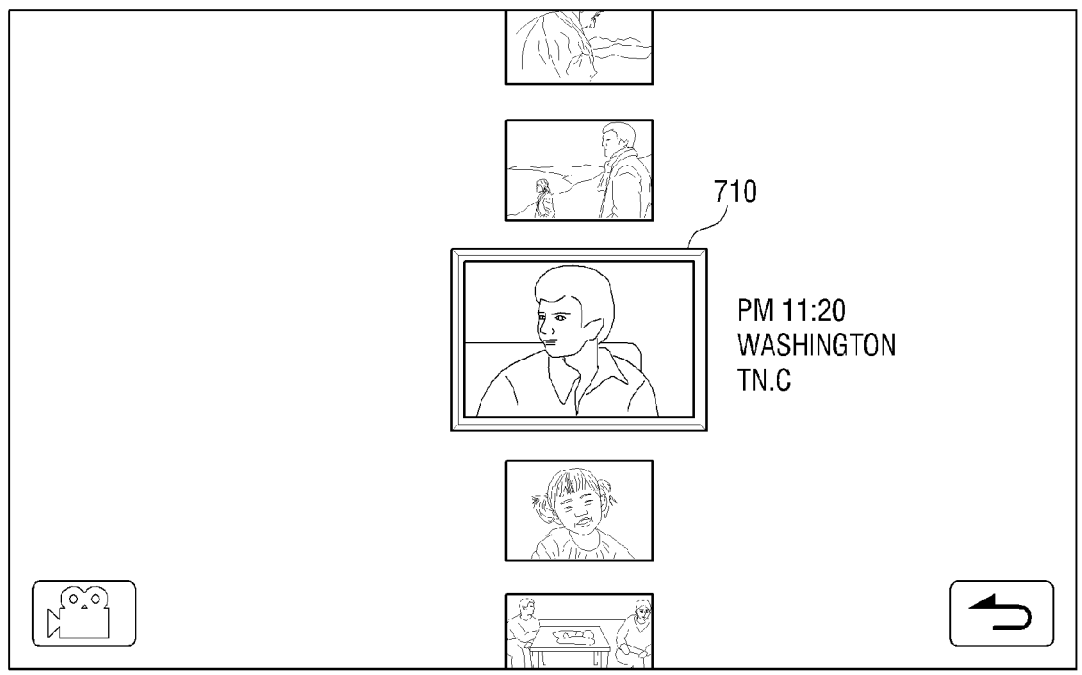

FIGS. 7A and 7B illustrate that a short stroke input downwards is received according to exemplary embodiments of the present general inventive concept. If a stroke input vertically is received, the camera 100 can search for an image according to a classification standard related to place.

FIG. 7A illustrates that a currently searched image 700 was captured in Washington (i.e., a place). If a short stroke downwards is received from the user as illustrated by the directional arrow in FIG. 7A, a previous image is searched, as illustrated in FIG. 7B. A currently searched image 710 in FIG. 7B can be a previous image which was captured in Washington.

Figure 8A:
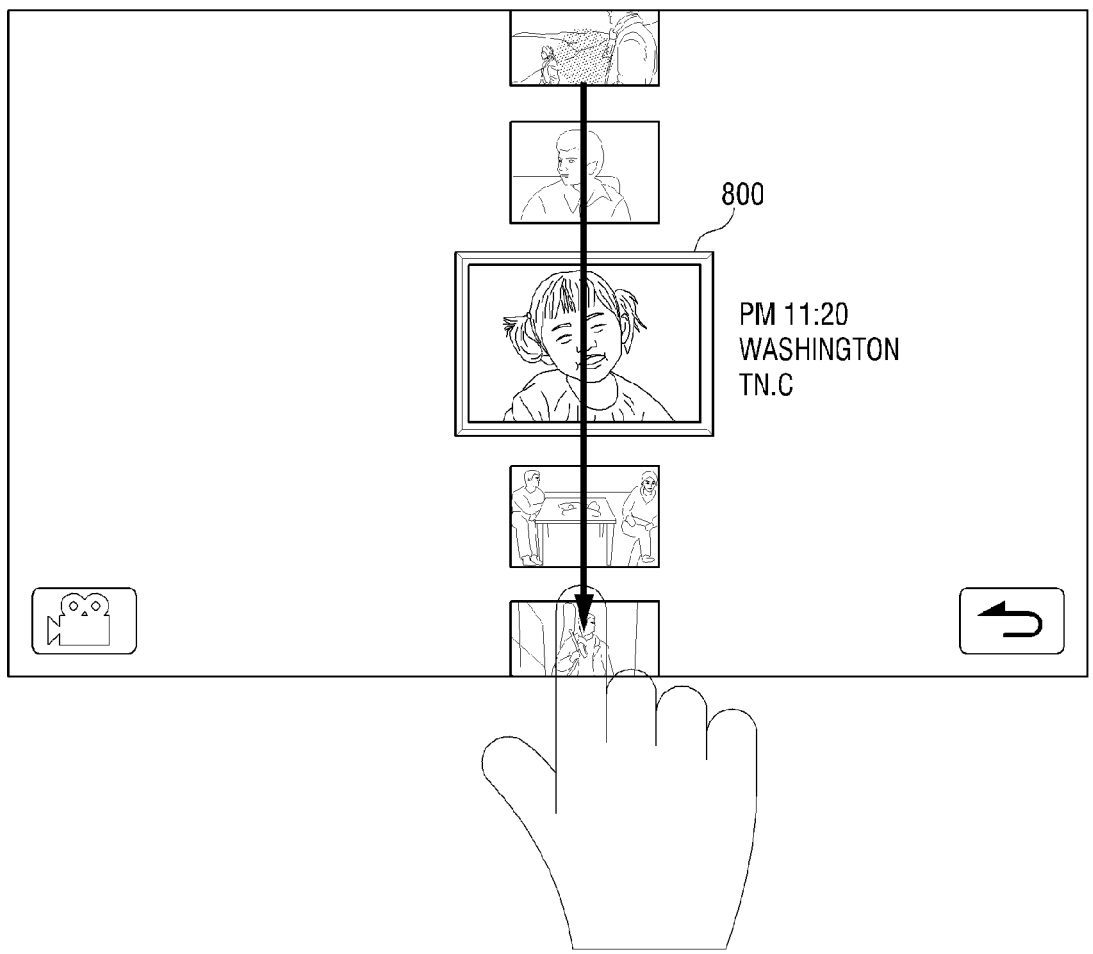
FIGS. 8A and 8B illustrate that a long stroke downwards is received as input according to an exemplary embodiment of the present general inventive concept.
Figure 8B:
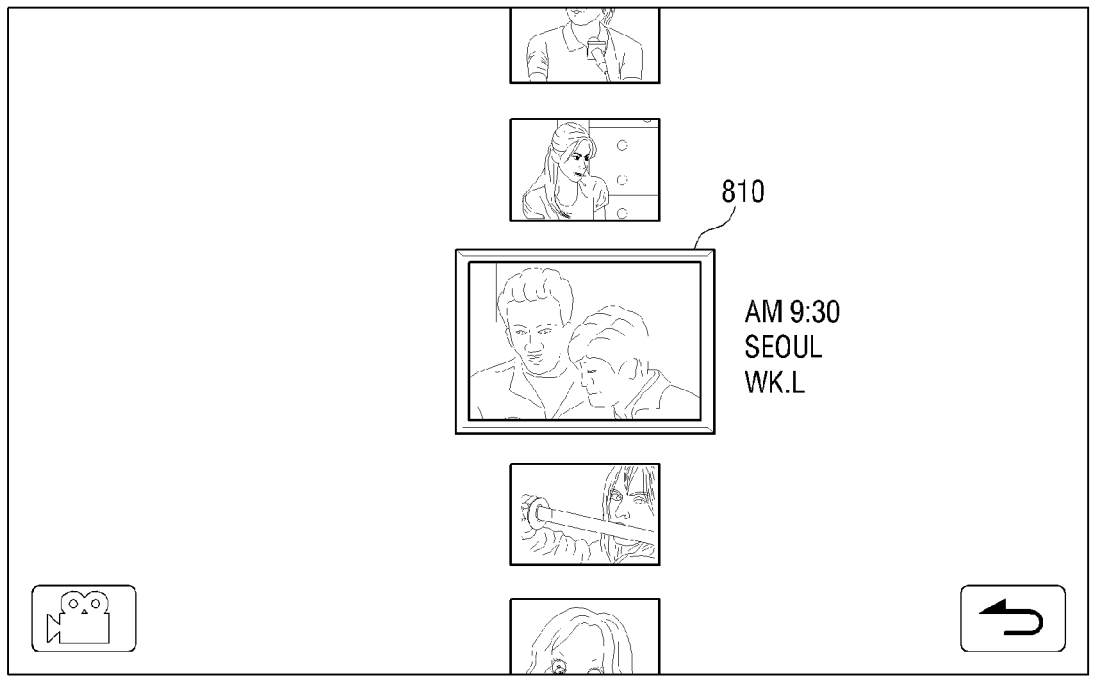

FIGS. 8A and 8B illustrate that a long stroke input downwards (e.g., as illustrated by the directional arrow illustrated in FIG. 8A) is received according to exemplary embodiments of the present general inventive concept. If a stroke is input vertically, the camera 100 can search for an image according to a classification standard related to place.

FIG. 8A illustrates that a currently searched image 800 was captured in Washington. If a long stroke downwards is received as input from a user as illustrated in FIG. 8A, an image of a previous place is searched, as illustrated in FIG. 8B. A currently searched image 810 as illustrated in FIG. 8B is an image which was captured in Seoul.

Figure 9A:
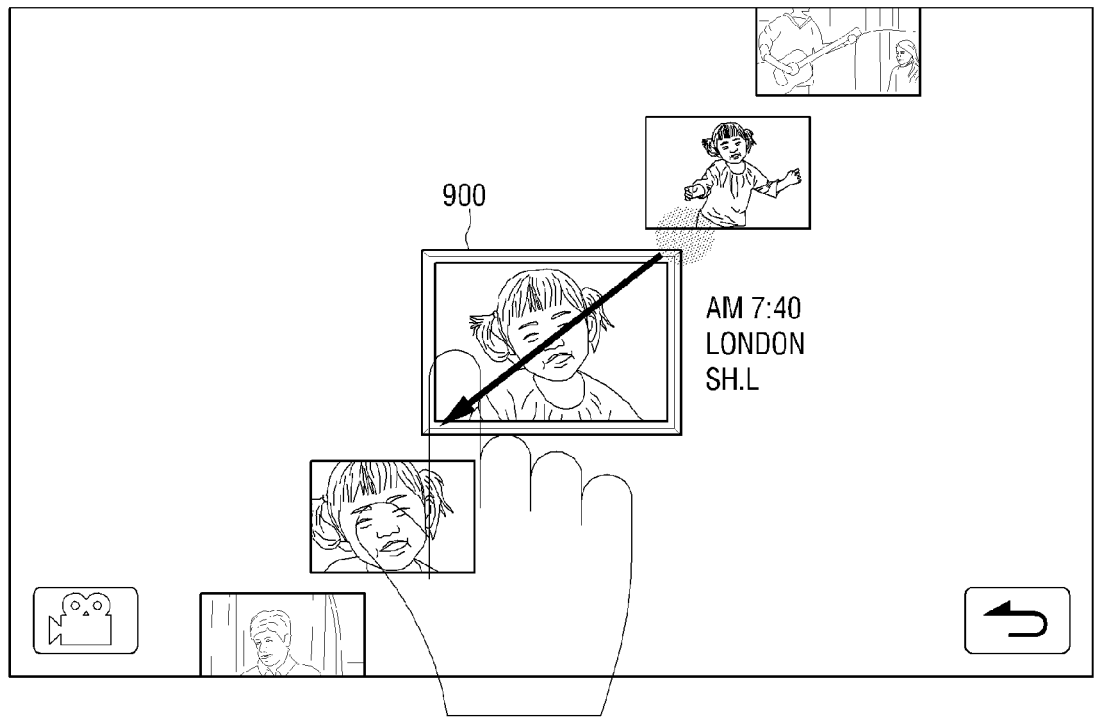
FIGS. 9A and 9B illustrate that a short stroke in a diagonal down direction is received as input according to exemplary embodiments of the present general inventive concept.
Figure 9B:
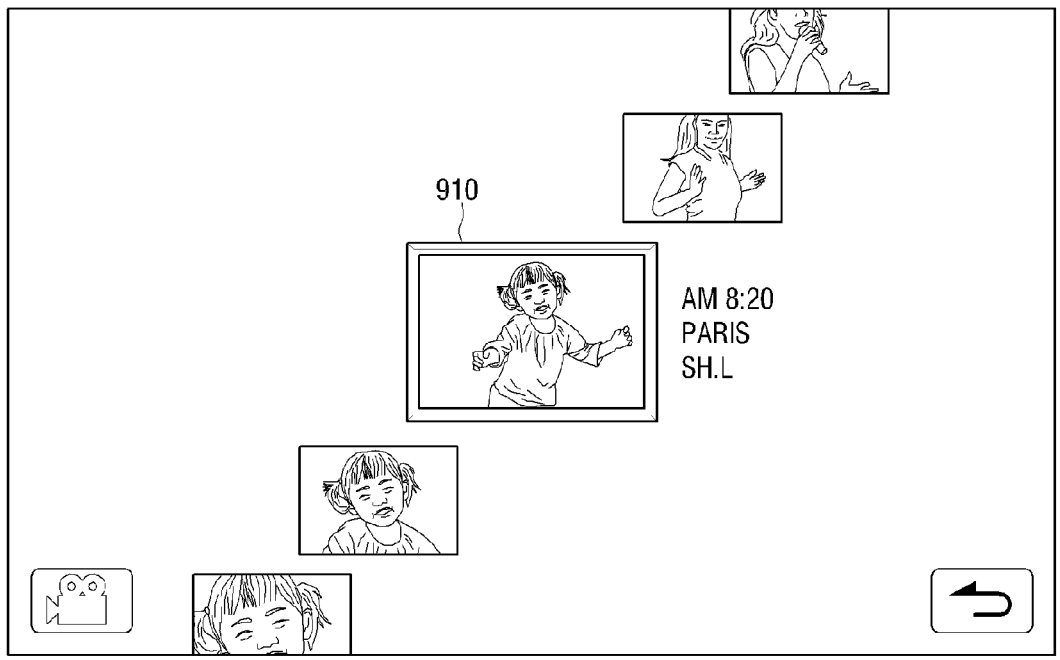

FIGS. 9A and 9B illustrate that a short stroke input is received in a diagonal down direction (e.g. as illustrated by the directional arrow in FIG. 9A) according to exemplary embodiments of the present general inventive concept. If a stroke is input diagonally (in the right upwards direction or in the left downward direction), the camera 100 can search for an image according to a classification standard related to person.

In FIG. 9A, a currently searched image 900 includes a person (e.g., person "SH.L"). If a short stroke input in the left downward direction is received as illustrated in FIG. 9A (e.g., as illustrated by the directional arrow), a previous image of the person "SH.L" is searched, as illustrated in FIG. 9B. Therefore, a currently searched image 910 in FIG. 9B is a previous image including the person "SH.L."

Figure 10A:
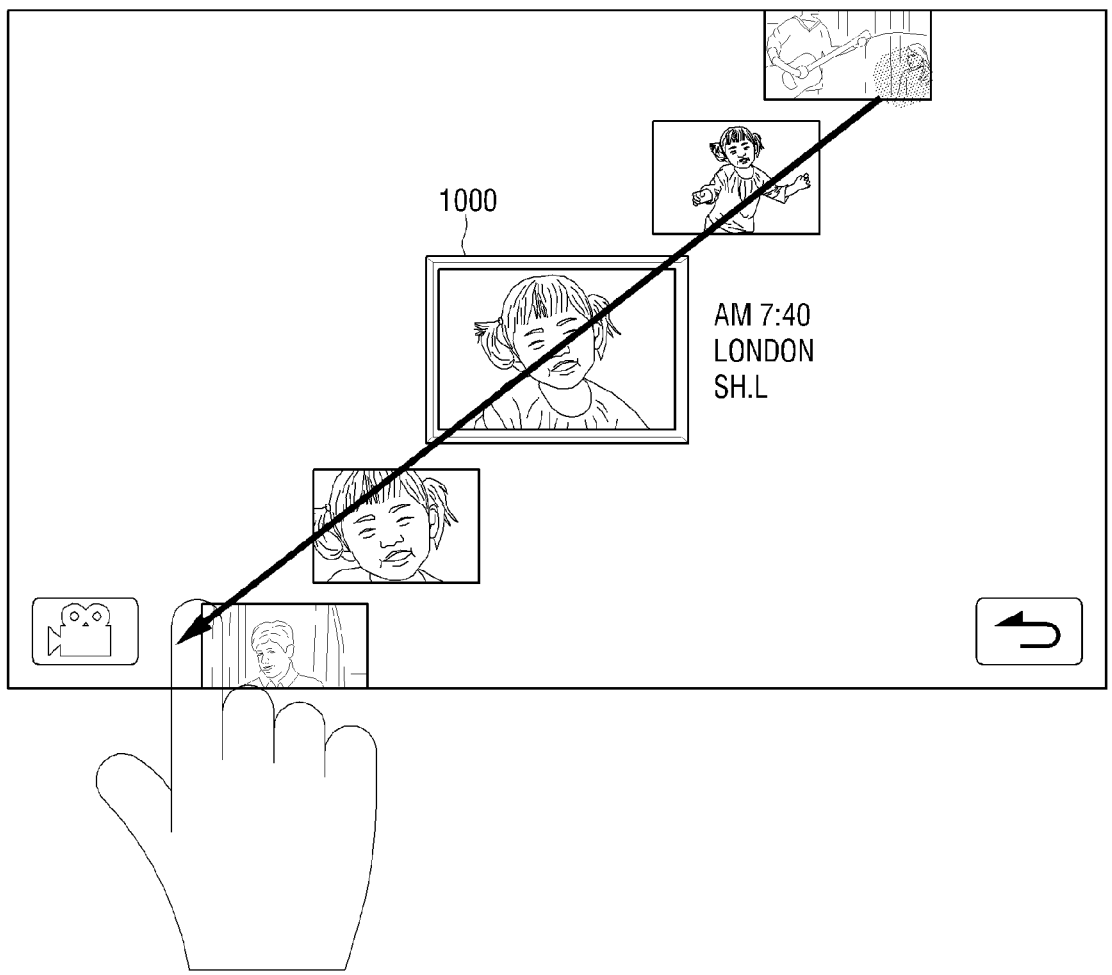
FIGS. 10A and 10B illustrate that a long stroke in a diagonal down direction is received as input according to an exemplary embodiment of the present general inventive concept.
Figure 10B:
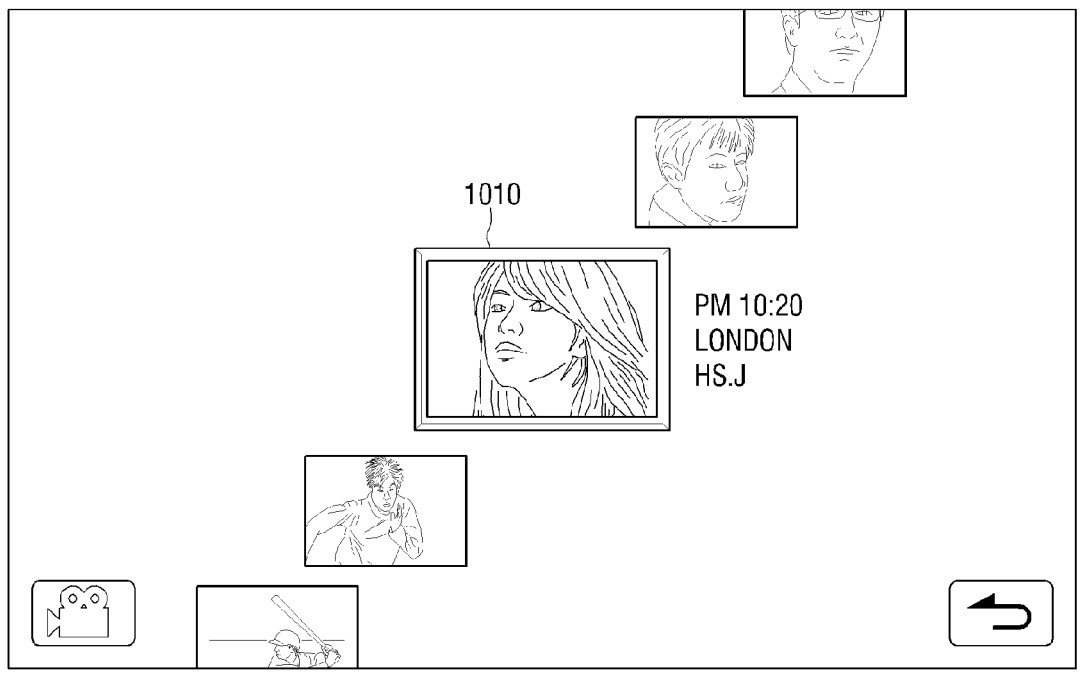

FIGS. 10A and 10B illustrate that a long stroke input is received in a diagonal down direction (e.g., as illustrated by the directional arrow in FIG. 10A) according to exemplary embodiments of the present general inventive concept. If a stroke input diagonally is received (e.g., in the right upwards direction or in the left downward direction as illustrated in FIG. 8A), the camera 100 can search for an image according to a classification standard related to person.

FIG. 10A illustrates a currently searched image 1000 includes a person "SH.L". If a long stroke input in the left downward direction is received as in FIG. 10A, an image of a different person can be searched, as illustrated in FIG. 10B. A currently searched image 1010 illustrated in FIG. 10B can be an image including a person "HS.J."

As described above, the camera 100 can search for an image using an image search menu in the thumbnail view mode by applying one or more different classification standards according to the direction of stroke received as input from a user. That is, the user can search for an image according to one or more classification standards by inputting a direction of a stroke.

FIGS. 11A to 11F illustrate a process of operating an image search menu in the single view mode according to exemplary embodiments of the present general inventive concept. As illustrated in FIGS. 11A to 11F, the camera 100 can search for an image using an image search menu in the single view mode by applying one or more different classification standards according to the direction of a received input stroke.

Figure 11A:
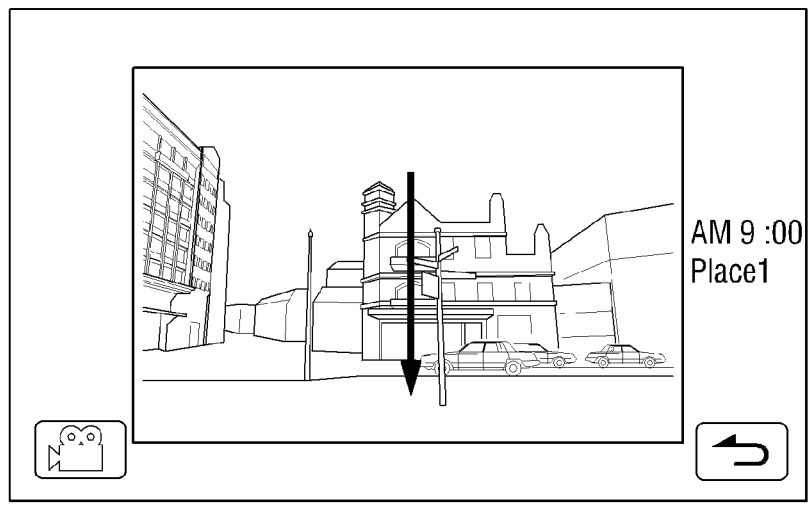
FIGS. 11A to 11F illustrate a process of operating an image search menu in a single view mode according to exemplary embodiments of the present general inventive concept.

Referring to FIG. 11A, when executing an image search menu in the single view mode, the camera 100 can display a currently searched image on the screen. For example, as illustrated in FIG. 11A, a place in which the image was captured can be identified in the display screen (e.g., the image of FIG. 11 was captured in "Place 1").

Figure 11B:
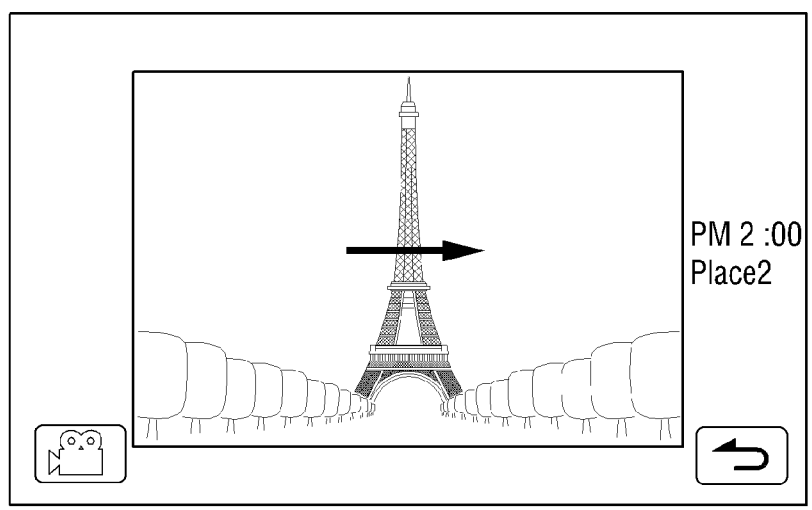

If a vertically input stroke is received, the camera 100 can search for an image according to a classification standard related to place. If a long stroke downwards is received from the user as illustrated by the direction arrow in FIG. 11A, an image which was captured in a different place (that is, an image in a different place category) can be searched, as illustrated in FIG. 11B. A currently searched image in FIG. 11B can be an image captured in "Place 2."

As illustrated in FIG. 11B, the image was captured at 2:00 pm. If a horizontal input stroke is received from a user, the camera 100 can search for an image according to a classification standard related to time.

Figure 11C:
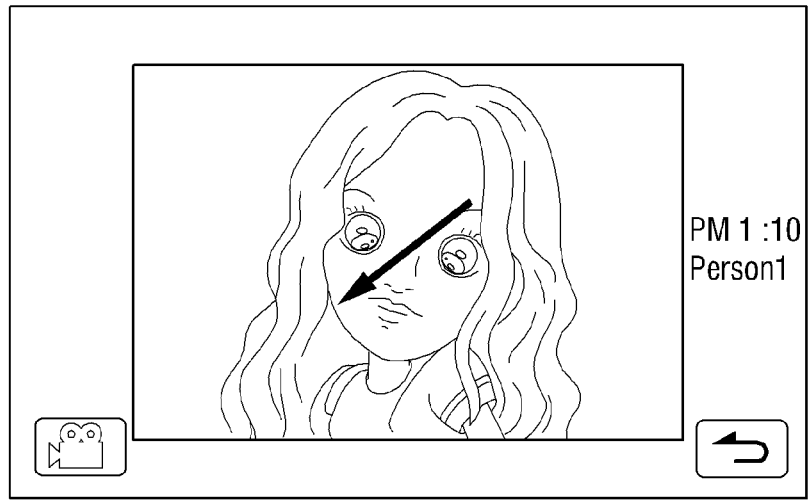

If a short input stroke to the right (e.g,. as illustrated by the directional arrow) is received from the user as in FIG. 11B, an image which is prior to the image illustrated in FIG. 11B is searched as in FIG. 11C. A currently searched image in FIG. 11C can be an image captured, for example, at 1:10 pm.

The image illustrated in FIG. 11C includes "Person 1." If a stroke is input diagonally as illustrated by the directional arrow in FIG. 11C, the camera 100 can search for an image according to a classification standard related to person.

Figure 11D:
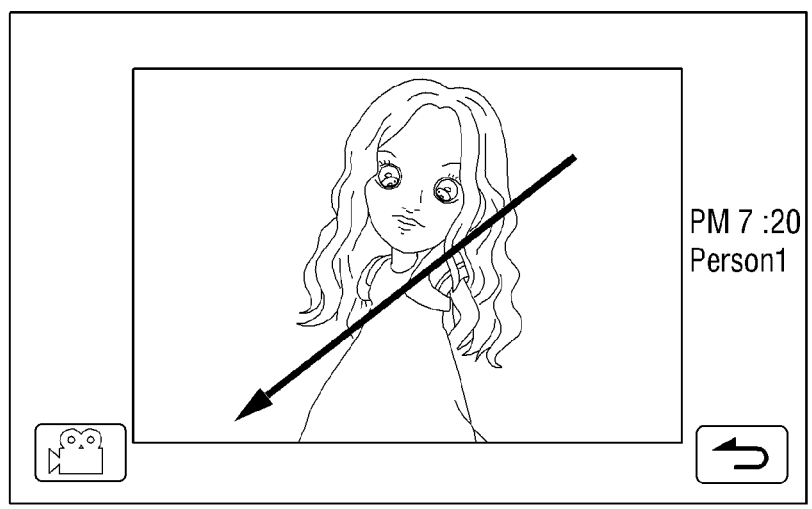

If a short stroke is received from a user in the left downward direction as in FIG. 11C, a previous image of the same person can be searched as illustrated in FIG. 11D. A currently searched image in FIG. 11D can be an image related to "Person 1."

Figure 11E:
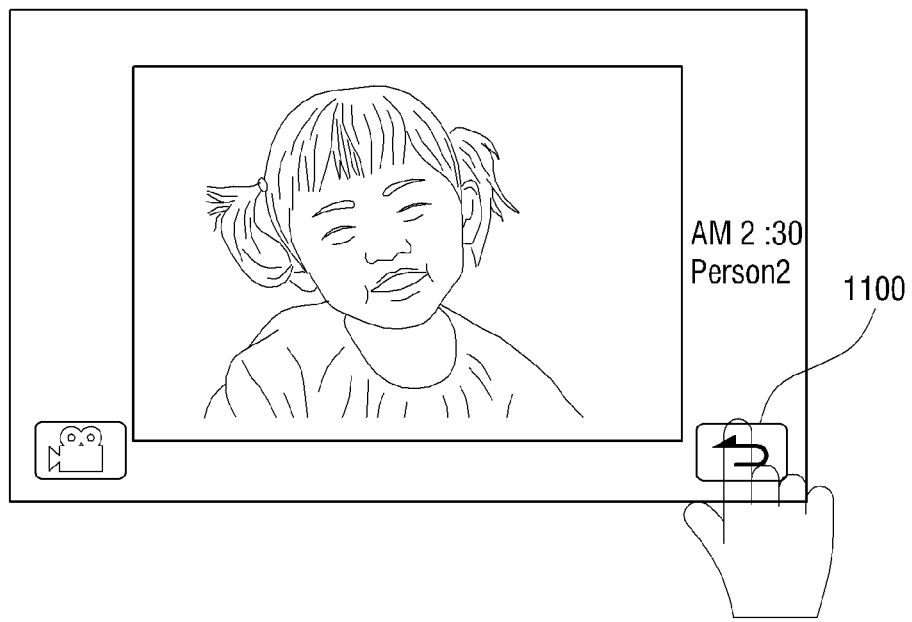

If a long stroke input in the left downward direction is received as illustrated by the directional arrow in FIG. 11D is received from a user, a previous image of a different person (that is, an image in a different person category) can be searched as illustrated in FIG. 11E. A currently searched image in FIG. 11E can be an image related to "Person 2."

Figure 11F:
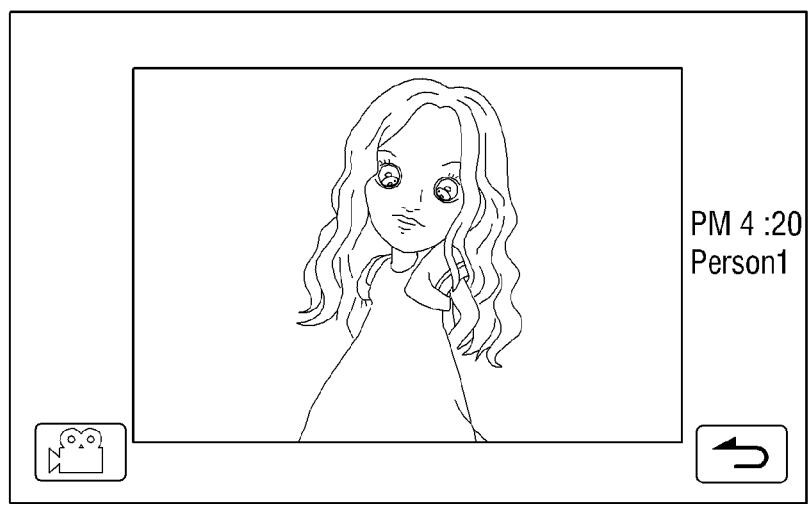

If a selection of a back button 1100 is received, the camera 100 can display a previously displayed image. If a selection of the back button 1100 is received as illustrated in FIG. 11E, the camera 100 can display a previously displayed image on the screen as illustrated in FIG. 11F.

Figure 12:
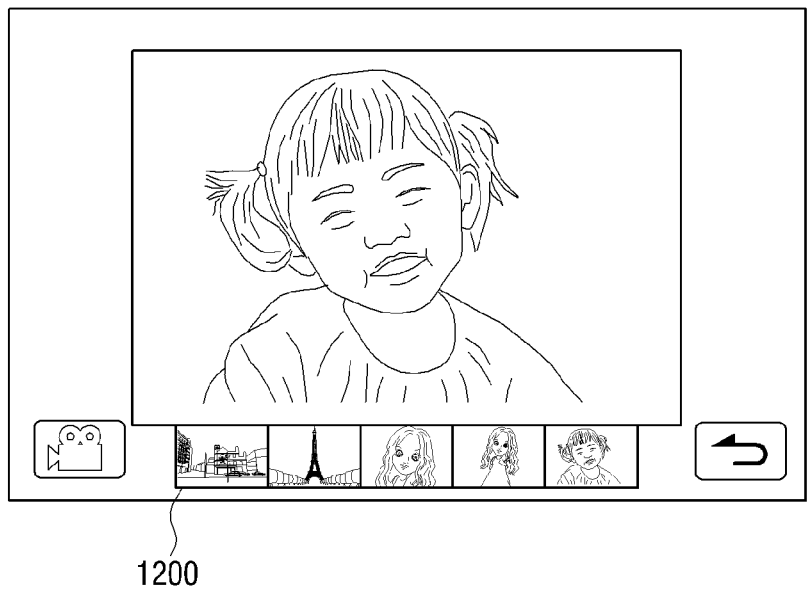
FIG. 12 illustrates a screen displaying a history of displayed images according to exemplary embodiments of the present general inventive concept.

FIG. 12 illustrates a screen displaying a history 1200 of displayed images according to exemplary embodiments of the present general inventive concept. As illustrated in FIG. 12, the camera 100 may display the history 1200 of images which have been searched on the display screen. Accordingly, the user can identify which images have been searched at a glance.

As described above, the camera 100 can search for an image using an image search menu in the single view mode by applying different classification standards according to the direction of the received input stroke. A desired image can be searched for according to one or more classification standards by receiving an input of the direction of stroke differently in the image search menu in the single view mode.

In exemplary embodiments of the present general inventive concept, the display apparatus can be, for example, included with the camera 100. The display apparatus may include any suitable device to search for and to display a desired (e.g., selected image, searched for image, etc.) image from among a plurality of images. For example, the display apparatus may be a television, a mobile phone, an MP3 player, a personal digital assistant (PDA), an electronic photo frame, and a notebook computer to display an image, or a camera, or any other suitable device to carry out the exemplary embodiments of the present general inventive concept.

In exemplary embodiments of the present general inventive concept, content can include images as illustrated in FIGS. 1-12 as described above, but the present general inventive concept may include other types of content such as music, movies, text, and so on.

For example, exemplary embodiments in which the display apparatus is an MP3 player and content is music files is described with reference to FIG. 13, which illustrates that a plurality of music files in the MP3 player are arranged in three axis directions.

If the display apparatus is an MP3 player, content to be searched may be music. For example, a first classification standard, a second classification standard, and a third classification standard may be related to genre, singer, and album, respectively. The MP3 player may arrange stored music files according to one or more classification standards related to genre, singer, and album along the x-axis, the y-axis, and the z-axis in a 3-dimensional space, as illustrated in FIG. 13.

Figure 13:
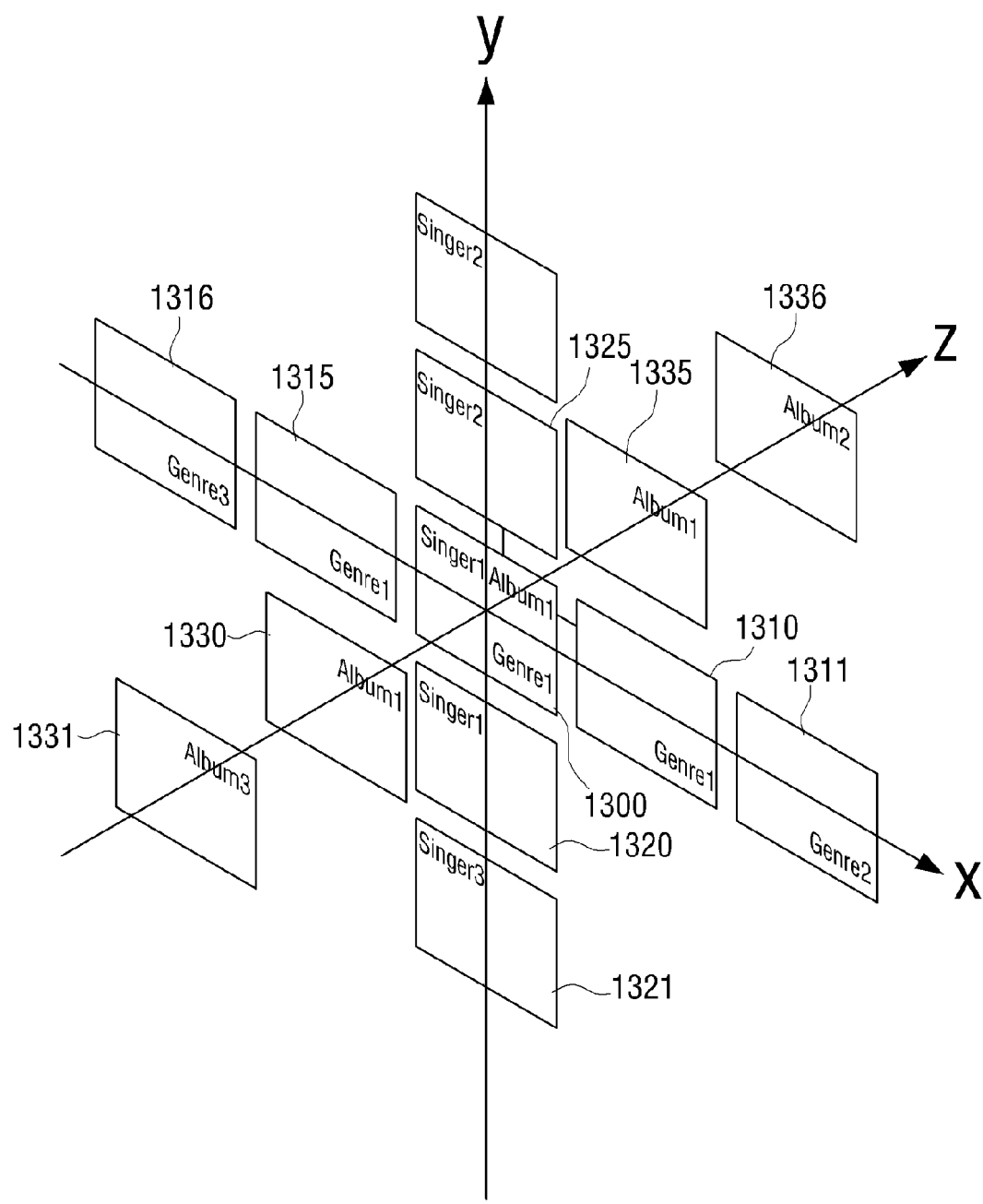
FIG. 13 illustrates that a plurality of music files in an MP3 player are arranged in three axis directions according to exemplary embodiments of the present general inventive concept.

Referring to FIG. 13, music files such as Genre 1, Genre 2, and Genre 3 can be arranged along the x-axis according to a classification standard related to, for example, a genre of music (e.g., classical, jazz, electronic, world, rock, etc.). Music files such as Singer 1, Singer 2, and Singer 3 can be arranged along the y-axis according to a classification standard related to a singer. Music files such as Album 1, Album 2, and Album 3 are arranged along the z-axis according to a classification standard related to an album. FIG. 13 illustrates a currently searched music file 1300 that can be related to Genre 1, Singer 1, and Album 1.

If music files are arranged as illustrated in FIG. 13, and if a short stroke input to the left (in the direction of −x) is received, the MP3 player can search for a subsequent music file (that is, a first music file 1310) according to the order of the genre of music. If a long stroke input to the left is received, the MP3 player can search for a music file (that is, a second music file 1311) of the genre (e.g., Genre 2) which is different from the genre (e.g., Genre 1) of the currently searched music file 1300 according to the order of the genre of music (that is, searches for a music file in a different genre category).

If a short stroke input to the right (in the direction of +x) is received, the MP3 player can search for a previous music file (that is, a third music file 1315) according to the order of the genre of music. If a long stroke input to the right is received, the MP3 player can search for a music file (that is, a fourth music file 1316) of the genre (Genre 3) which is different from the genre (Genre 1) of the currently searched music file 1300 according to the order of the genre of music (that is, searches for a music file in a different genre category).

If music files are arranged as illustrated in FIG. 13, and if a short stroke input downwards (in the direction of −y) is received, the MP3 player can search for a subsequent music file (that is, a fifth music file 1325) according to the order of singer of music. If a long input stroke input downwards is received, the MP3 player can search for a music file (that is, the fifth music file 1325) of the singer (Singer 2) which can be different from the singer (Singer 1) of the currently searched music file 1300 according to the order of singer of music (that is, searches for a music file in a different singer category).

If a short stroke input upwards (in the direction of +y) is received, the MP3 player can search for a subsequent music file (that is, a sixth music file 1320) according to the order of singers of music. If a long stroke input upwards is received, the MP3 player searches for a music file (that is, a seventh music file 1321) of the singer (e.g., Singer 3) which is different from the singer (e.g., Singer 1) of the currently searched music file 1300 according to the order of music singers (that is, searches for a music file in a different singer category).

If music files are arranged as illustrated in FIG. 13, and if a short stroke input in the left downward direction (in the direction of −z) is received, the MP3 player can search for a subsequent music file (that is, an eighth music file 1335) according to the order of album of music. If a long stroke input in the left downward direction is received, the MP3 player can search for a music file (that is, the ninth music file 1336) of the album (e.g., Album 2) which can be different from the album (e.g., Album 1) of the currently searched music file 1300 according to the order of album of music (that is, searches for a music file in a different album category).

If a short stroke input in the right upward direction (in the direction of +z) is received, the MP3 player can search for a previous music file (that is, a tenth music file 1330) according to the order of album of music. If a long stroke input in the right upward direction is received, the MP3 player can search for a music file (that is, an eleventh music file 1331) of the album (Album 3) which can be different from the album (Album 1) of the currently searched music file 1300 according to the order of album of music (that is, searches for a music file in a different album category).

As described above, the MP3 player can search for a music file of a different classification standard according to the direction of the stroke.

Exemplary embodiments of the present general inventive concept may be applied when a display apparatus is an MP3 player and content is music.

As can be appreciated from the exemplary embodiments of the present general inventive concept, a method of providing a user interface (UI) in which a manipulation for two or more axis directions is input and two or more classification standards are applied according to the direction in which the operation is input so that one of the images may be found, and a display apparatus adopting the same are provided. The user may easily search for a desired image using diverse classification standards.

In particular, a classification standard may be changed by receiving a changed direction of touch input to search for a desired image with one or more classification standards with greater ease.

Although various embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A method of providing a user interface (UI), the method comprising:
   receiving an input manipulation in one of first and second axis directions; and
   searching for one of a plurality of images according to a first classification criteria to categorize images when the received input manipulation is in the first axis direction and searching for one of a plurality of images according to a second classification criteria to categorize images when the received input manipulation is in the second axis direction.

2. The method according to claim 1, wherein the receiving comprises receiving an input manipulation in one of the first, the second, and a third axis directions, and the searching for one of the plurality of images comprises:
   searching for an image according to a third classification criteria to categorize images when the received input manipulation is in the third axis direction.

3. The method according to claim 2, wherein on a display, the first axis direction is a horizontal direction, the second axis direction is a vertical direction, and the third axis direction is a diagonal direction.

4. The method according to claim 3, wherein the first classification criteria to categorize images, the second classification criteria to categorize images, and the third classification criteria to categorize images each correspond to one of time, person, place, color, event, and type of scene.

5. The method according to claim 2, wherein the received input manipulation is a short stroke or a long stroke, and
   the searching for the image according to the first classification standard comprises:
   searching for a previous image or a subsequent image according to the first classification criteria to categorize images when the short stroke of the received input manipulation is in the first axis direction; and
   searching for an image in a different category according to the first classification criteria to categorize images when the long stroke of the received input manipulation is in the first axis direction.

6. The method according to claim 2, wherein the received input manipulation is a short stroke or a long stroke, and
   the searching for the image according to the second classification standard comprises:
   searching for a previous image or a subsequent image according to the second classification criteria to categorize images when the short stroke of the received input manipulation is in the second axis direction; and
   searching for an image in a different category according to the second classification criteria to categorize images when the long stroke of the received input manipulation is in the second axis direction.

7. The method according to claim 2, wherein when a currently searched image changes, the plurality of images are rearranged according to the first, second and third classification criteria to categorize images according to the changed image.

8. The method according to claim 2, further comprising:
   displaying thumbnails of images classified according to the first classification criteria to categorize images in an x-axis direction in a 3-dimensional space of a display;
   displaying thumbnails of images classified according to the second classification criteria to categorize images in an y-axis direction in the 3-dimensional space of the display; and
   displaying thumbnails of images classified according to the third classification criteria to categorize images in a z-axis direction in the 3-dimensional space of the display.

9. The method according to claim 2, further comprising:
   displaying only a currently searched image on a display from among the plurality of images to be searched.

10. A display apparatus, comprising:
    a storage unit to store a plurality of images;
    a manipulation unit to receive an input manipulation in one of a first and a second axis directions; and
    a control unit to search for one of the plurality of images according to a first classification criteria to categorize images when the received input manipulation is in the first axis direction and to search for one of the plurality of images according to a second classification criteria to categorize images when the received input manipulation is in the second axis direction.

11. The display apparatus according to claim 10, wherein the manipulation unit receives an input manipulation in one of the first, the second, and a third axis directions, and the control unit searches for one of the plurality of images according to the third classification criteria to categorize images when the received manipulation input is in the third axis direction.

12. The display apparatus according to claim 11, wherein on a display, the first axis direction is a horizontal direction, the second axis direction is a vertical direction, and the third axis direction is a diagonal direction.

13. The display apparatus according to claim 12, wherein the first classification criteria to categorize images, the second classification criteria to categorize images, and the third classification criteria to categorize images each correspond to one of time, person, place, color, event, and type of scene.

14. The display apparatus according to claim 11, wherein the received input manipulation is a short stroke or a long stroke, and the control unit searches for a previous image or a subsequent image according to the first classification criteria to categorize images when the short stroke of the received input manipulation is in the first axis direction, and the control unit searches for an image in a different category according to the first classification criteria to categorize images when the long stroke of the received input manipulation is in the first axis direction.

15. The display apparatus according to claim 11, wherein the received input manipulation is a short stroke or a long stroke, and the control unit searches for a previous image or a subsequent image according to the second classification criteria to categorize images when the short stroke of the received input manipulation is in the second axis direction, and the control unit searches for an image in a different category according to the second classification criteria to categorize images when the long stroke of the received input manipulation is in the second axis direction.

16. The display apparatus according to claim 11, wherein when a currently searched image changes, the control unit rearranges the plurality of images according to the first, second and third classification criteria to categorize images according to the changed image.

17. The display apparatus according to claim 11, wherein the control unit displays thumbnails of images classified according to the first classification criteria to categorize images in an x-axis direction in a 3-dimensional space of a display, the control unit displays thumbnails of images classified according to the second classification standard in an y-axis direction in the 3-dimensional space of the display, and the control unit displays thumbnails of images classified according to the third classification criteria to categorize images in a z-axis direction in the 3-dimensional space of the display.

18. The display apparatus according to claim 11, wherein the control unit displays only a currently searched image on a display from among the plurality of images to be searched.

19. A method of providing a user interface (UI), the method comprising:

displaying thumbnails of images classified according to a first classification criteria to categorize images in a first axis direction in a 3-dimensional space of a display;

displaying thumbnails of images classified according to a second classification criteria to categorize images in a second axis direction in the 3-dimensional space of the display; and displaying thumbnails of images classified according to a third classification criteria to categorize images in a third axis direction in the 3-dimensional space of the display.

20. A method of providing a user interface (UI), the method comprising:

searching for content according to a first classification criteria to categorize images when an input manipulation in a first axis direction is received;

searching for content according to a second classification criteria to categorize images when an input manipulation in a second axis direction is received; and searching for content according to a third classification criteria to categorize images when an input manipulation in a third axis direction is received.

21. The method according to claim 20, wherein the content is music, the first classification criteria to categorize images is a genre, the second classification criteria to categorize images is a singer, and the third classification criteria to categorize images is an album.

22. A method of searching for stored content with a graphical user interface of a display apparatus, the method comprising:

receiving an input manipulation from the graphical user interface of the display apparatus in a plurality of axis directions to select a classification criteria to categorize images of the content to be searched; and searching for stored content in a storage unit of a display apparatus according to the received input manipulation.

23. The method of claim 22, further comprising:

receiving a selection a type of the stored content with the graphical user interface of the display apparatus.

24. The method of claim 22, wherein each axis of the plurality of axis directions is a different classification criteria to categorize images of the content.

* * * * *